United States Patent
Chien et al.

(10) Patent No.: US 11,122,528 B2
(45) Date of Patent: Sep. 14, 2021

(54) BASE STATION FOR MOBILE COMMUNICATION SYSTEM

(71) Applicant: Institute For Information Industry, Taipei (TW)

(72) Inventors: Chun-Che Chien, Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 16/784,236

(22) Filed: Feb. 6, 2020

(65) Prior Publication Data
US 2020/0267672 A1 Aug. 20, 2020

Related U.S. Application Data

(60) Provisional application No. 62/805,930, filed on Feb. 14, 2019.

(51) Int. Cl.
*H04W 56/00* (2009.01)

(52) U.S. Cl.
CPC ..... *H04W 56/001* (2013.01); *H04W 56/0055* (2013.01)

(58) Field of Classification Search
None
See application file for complete search history.

(56) References Cited

U.S. PATENT DOCUMENTS

| | | | |
|---|---|---|---|
| 2007/0021121 A1* | 1/2007 | Lane | G01S 5/0009 455/441 |
| 2017/0006570 A1* | 1/2017 | Xu | H04W 56/0065 |
| 2018/0206208 A1* | 7/2018 | Nguyen | H04W 72/005 |
| 2019/0007917 A1* | 1/2019 | Olofsson | H04W 56/0015 |
| 2019/0261258 A1* | 8/2019 | Lindoff | H04W 88/06 |

* cited by examiner

*Primary Examiner* — Saad Khawar
(74) *Attorney, Agent, or Firm* — Skaar Ulbrich Macari, P.A.

(57) ABSTRACT

A base station (BS) for a mobile communication system is provided. As for a user equipment (UE), the BS is a primary BS and connects to a secondary BS. The primary BS calculates the time synchronization error between the primary BS and the UE, and the time synchronization error between the secondary BS and the UE. These time synchronization errors are associated with the subcarrier spacings (SCSs) of the primary and secondary BSs, respectively. According to the calculated time synchronization errors, the primary BS transmits a synchronization indication message to instruct the UE to receive the reference time information of one of the primary and secondary BSs.

19 Claims, 18 Drawing Sheets

| Error factors | | Error type | Requirements for different SCS (kHz) (unit: ns) | | | |
|---|---|---|---|---|---|---|
| | | | 15 kHz | 30 kHz | 60 kHz | 120 kHz |
| E1.1 | | Transmission synchronization signal time error caused by the BS | 65 | 65 | 65 | 65 |
| E1.2 | | Detection synchronization signal time error caused by the UE | 261 | 260 | 163 | 98 |
| E1.3 | | Propagation delay time estimation error: (E1.3.1+E1.3.2+E1.3.3)/2 | 456 | 325 | 228 | 122 |
| E1.3.1 | | Preamble sequence transmission time error caused by the UE | 391 | 260 | 228 | 114 |
| E1.3.2 | | Preamble sequence detection time error caused by the BS | 261 | 260 | 163 | 98 |
| E1.3.3 | | TA granularity time error | 260 | 130 | 65 | 32 |
| E2 | | Reference time information granularity time error | 125 | 125 | 125 | 125 |
| Total | | 2*(E1.1+E1.2+E1.3+E2+E3) | 2144 | 1750 | 1426 | 1036 |

TAB

FIG. 1

BASE STATION FOR MOBILE COMMUNICATION SYSTEM

PRIORITY

This application claims priority to U.S. Provisional Patent Application No. 62/805,930, filed on Feb. 14, 2019, which is hereby incorporated herein by reference in its entirety.

FIELD

The present invention relates to a base station for mobile communication system. More particularly, the base station of the present invention determines from which a user equipment has to receive a piece of reference time information by calculating time synchronization errors associated with subcarrier spacings.

BACKGROUND

With the rapid development of wireless communication technologies, wireless communication has found wide application in people's life, and people's demand for wireless communication is increasing. The next generation of mobile communication system (which is generally referred to as the 5G mobile communication system currently) has proposed new service types, e.g., Ultra-reliable and Low Latency Communication (URLLC), Enhanced Mobile Broadband (eMBB) communication, and Massive Machine Type Communication (mMTC). Among these service types, URLLC service type satisfies low latency and ultra-reliability transmission requirements, so URLLC service type is quite suitable for vehicular communication or industrial communication.

Furthermore, traditional industrial communication uses the time sensitive networking (TSN) communication standard which transmits data over the Ethernet network. In response to the development of the 5G mobile communication system, academia and industry now are discussing whether the TSN system is able to be integrated into the 5G mobile communication system (i.e., the 5G time sensitive communication (TSC)) so that devices of the TSN system can communicate with each other through the 5G mobile communication system, especially between the central control device of the TSN system and the distributed industrial operation devices.

There are various types of devices in the TSN system, including robotic arms, industrial control machines, etc. Since these devices need to cooperate with each other and most of their transmission is periodic, time synchronization among these devices will be obviously critical, e.g., the time synchronization error must be strictly controlled to a level less than 1 microseconds (μs). In this case, it is necessary to face the problems of time synchronization among devices for integrating the TSN system into the 5G mobile communication system. In addition, in other service types, such as the URLLC service type or the eMBB service type, the devices may also need to synchronize time with each other, e.g., operations among autonomous vehicles.

Accordingly, an urgent need exists in the art to provide a time synchronization mechanism to make devices of the 5G mobile communication system can meet time synchronization needs, and to further integrate the TSN system into the 5G mobile communication system.

SUMMARY

An objective herein is to provide a time synchronization mechanism which determines from which a user equipment has to receive a piece of reference time information by calculating time synchronization errors associated with subcarrier spacings (SCSs). Accordingly, the time synchronization mechanism can satisfy the requirement of the time synchronization between user equipments (UEs) and can further integrate the TSN system into the 5G mobile communication system. In addition, the time synchronization mechanism also improves the time synchronization between the UEs of the URLLC service type and the eMBB service type.

The disclosure includes a base station (BS) for a mobile communication system. The BS comprises a transceiver, a network interface, and a processor. The BS is a primary BS for a user equipment (UE). The network interface is configured to connect to a secondary BS. The processor is electrically connected to the transceiver and the network interface, and is configured to execute the following operations: calculating a first time synchronization error between the BS and the UE, the first time synchronization error being associated with a first subcarrier spacing (SCS) of the BS; calculating a second time synchronization error between the secondary BS and the UE, the second time synchronization error being associated with a second SCS of the secondary BS; determining a smaller time synchronization error between the first time synchronization error and the second time synchronization error, the smaller time synchronization error corresponding to a target BS, the target BS being one of the BS and the secondary BS; generating a synchronization indication message, the synchronization indication message indicating one of the BS and the secondary BS; and transmitting the synchronization indication message to the UE via the transceiver to make the UE to receive a piece of reference time information of the target BS from one of the BS and the secondary BS.

The disclosure also includes a base station (BS) for a mobile communication system. The BS comprises a transceiver, a global navigation satellite system (GNSS) receiver, and a processor. The processor is electrically connected to the transceiver and the GNSS receiver, and is configured to execute the following operations: receiving a piece of external reference time information from a satellite via the GNSS receiver; calculating a first time synchronization error between a user equipment (UE) and the BS; calculating a second time synchronization error between the UE and the satellite; determining whether the first time synchronization error is smaller than the second time synchronization error to generate a synchronization indication message; and transmitting the synchronization indication message to the UE via the transceiver. When the first time synchronization error is smaller than the second time synchronization error, the synchronization indication message indicates the BS to make the UE to receive a piece of reference time information of the BS from the BS according to the synchronization indication message, and when the first time synchronization error is larger than the second time synchronization error, the synchronization indication message indicates the satellite to make the UE to receive the external reference time information from the satellite according to the synchronization indication message.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1 illustrates a table listing every relevant time error according to the present invention.

DETAILED DESCRIPTION

Figure 2:
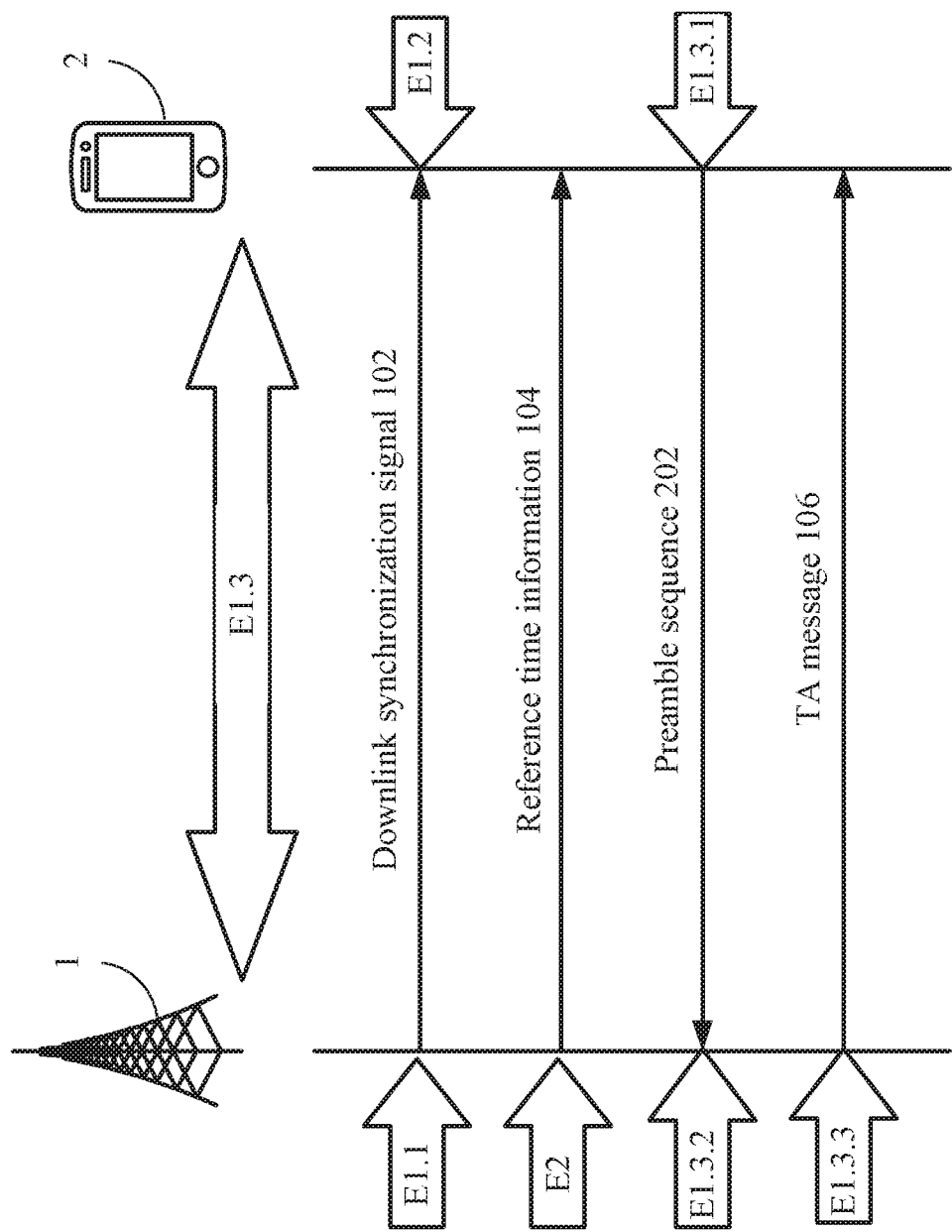
FIG. 2 is a schematic view of each time error which occurs during the signal transmission between the BS 1 and the UE 2 according to the present invention.

In the following description, the present invention will be explained with reference to certain example embodiments thereof. These example embodiments are not intended to limit the present invention to any particular environment, embodiment, example, applications or implementations described in these example embodiments. Therefore, description of these example embodiments is only for purpose of illustration rather than to limit the present invention.

It shall be appreciated that in the following embodiments and the attached drawings, elements unrelated to the present invention are omitted from depiction; and dimensional relationships among individual elements in the attached drawings are illustrated only for ease of understanding, but not to limit the actual scale.

Please refer to FIG. 1 to FIG. 5 for a first embodiment of the present invention. In this embodiment, for simplification of the description, only the implementation scenario between the BS 1 (hereinafter the primary BS 1) and the user equipment (UE) 2 and the implementation scenario between the BS 3 (hereinafter the secondary BS 3) and the UE 2 are taken for illustrating how the BS 1 determines a piece of reference time information for the UE 2 by calculating time synchronization errors associated subcarrier spacings (SCSs). The components and the functions of the components relevant to the primary BS 1 will be further described in the embodiments corresponding to FIG. 15 and FIG. 16. It shall be appreciated by those of ordinary skill in the art, that in other implementation scenarios of the present invention, other UEs may be also involved and the similar operations may also be performed for these UEs to instruct them from where to receive the time synchronization information so that the time synchronization between the UEs can be realized, and thus it will not be further described herein.

The BS 1 is adapted for a mobile communication system which may be the next generation of mobile communication system (broadly called the 5G mobile communication system currently) or any mobile communication systems based on the orthogonal frequency division multiple access (OFDMA) technology. The following description is based on the 5G mobile communication system to illustrate the present invention; however, how to extend the technical means of the present invention to be applied to other OFDMA-based mobile communication systems shall be appreciated by those of ordinary skill in the art, and thus will be not further described herein. In this embodiment, the UE 2 may be a robotic arm, an industrial control machine, etc. in the time sensitive networking (TSN) system. However, in other embodiments, the UE 2 may be devices of the URLLC service type or eMBB service type, e.g., an autonomous vehicle.

The BS 1 is a primary BS for the UE 2, and the primary BS 1 connects to the secondary BS 3. The UE 2 connects to the primary BS 1 and the secondary BS 3 at the same time. The primary BS 1 calculates a first time synchronization error between the primary BS 1 and the UE 2, and calculates a second time synchronization error between the secondary BS 3 and the UE 2 to determine that the UE 2 has to synchronize its time with which BS and receive a piece of reference time information from which BS.

For example, the first time synchronization error may include at least one of a first detection synchronization signal time error caused by the UE and a first propagation delay time estimation error. The first propagation delay time estimation error may include at least one of a first preamble sequence transmission time error caused by the UE, a first preamble sequence detection time error caused by the BS, and a first timing advance (TA) granularity time error.

To be more specific, FIG. 1 shows a table TAB listing the relationship between the different error types and the time errors caused by the different SCSs. It can be seen from FIG. 1 that the time errors which are associated with the SCS of the BS include the detection synchronization signal time error caused by the UE (i.e., the error factor E1.2) and the propagation delay time estimation error (i.e., the error factor E1.3). The propagation delay time estimation error further includes the preamble sequence transmission time error caused by the UE (i.e., the error factor E1.3.1), the preamble sequence detection time error caused by the BS (i.e., the error factor E1.3.2), and the TA granularity time error (i.e., the error factor E1.3.3). Besides, the time errors which are irrelevant to the SCS of the BS include the transmission synchronization signal time error caused by the BS (i.e., the error factor E1.1) and the reference time information granularity time error (i.e., the error factor E2).

It can be learned from the table TAB shown in FIG. 1 that all of the first detection synchronization signal time error, the first propagation delay time estimation error, the first preamble sequence transmission time error, the first preamble sequence detection time error, and the first TA granularity time error are associated with the first SCS of the primary BS 1. Therefore, the first time synchronization error between the UE 2 and the primary BS 1 varies according to the setting of the first SCS of the primary BS 1.

Similarly, the second time synchronization error may include at least one of a second detection synchronization signal time error caused by the UE and a second propagation delay time estimation error, and the second propagation delay time estimation error may include at least one of a second preamble sequence transmission time error caused by the UE, a second preamble sequence detection time error caused by the BS, and a second TA granularity time error. The second detection synchronization signal time error, the second propagation delay time estimation error, the second preamble sequence transmission time error, the second preamble sequence detection time error, and the second TA granularity time error are associated with the second SCS of the secondary BS 3. Therefore, the second time synchronization error between the UE 2 and the secondary BS 3 varies according to the setting of the second SCS of the secondary BS 3.

Please refer to FIG. 2. For simplification of the description, only the signal transmissions between the primary BS 1 and the UE 2 is taken as the examples to describe each error type that occurs during the signal transmission between the primary BS 1 and the UE 2. It shall be appreciated by those of ordinary skill in the art that these error types also occur during the signal transmission between the secondary BS 3 and the UE 2, and thus will not be further described herein.

The primary BS 1 transmits the downlink synchronization signal 102 to the UE 2 to make the UE 2 achieve downlink synchronization with the primary BS 1. The downlink synchronization signal 102 may be obtained from a synchronization signal block (SSB) or may be a demodulation reference signal (DMRS). The transmission synchronization signal time error (i.e., the error factor E1.1) is the error occurring when the primary BS 1 transmits the downlink synchronization signal 102, and the preamble sequence detection time error (i.e., the error factor E1.3.2) is the error occurring when the UE 2 receives the downlink synchronization signal 102. The primary BS 1 further broadcasts the reference time information 104, which describes the time information of a position of a frame boundary, through a system information block (SIB). Besides, the primary BS 1 may also unicast the reference time information 104 through a UE-specific radio resource control (RRC) message. The reference time information granularity time error (i.e., the error factor E2) is the error occurring when the primary BS 1 generates the reference time information 104.

Then, the UE 2 transmits the preamble sequence 202 to the primary BS 1. After detecting the preamble sequence 202, the primary BS 1 transmits the TA message 106 to the UE 2 to make the UE 2 achieve uplink synchronization with the primary BS 1 according to the TA message 106. The preamble sequence transmission time error (i.e., the error factor E1.3.1) is the error occurring when the UE 2 transmits the preamble sequence. The preamble sequence detection time error (i.e., the error factor E1.3.2) is the error occurring when the primary BS 1 detects the preamble sequence 202, and the TA granularity time error (i.e., the error factor E1.3.3) is the error occurring when the primary BS 1 transmits the TA message 106.

The detection synchronization signal time error (i.e., the error factor E1.2), the preamble sequence transmission time error (i.e., the error factor E1.3.1), and the preamble sequence detection time error (i.e., the error factor E1.3.2) are the errors caused by the primary BS 1 and the UE 2 when they transmit and receive signals. Furthermore, the propagation delay time estimation error (i.e., the error factor E1.3 including the error factors E1.3.1, E1.3.2, and E1.3.3) is the error mainly caused by calculation of signal propagation path delays between the primary BS 1 and the UE 2. Therefore, the whole time error may include the transmission synchronization signal time error (i.e., the error factor E1.1), the propagation delay time estimation error (i.e., the error factor E1.3), and the reference time information granularity time error (i.e., the error factor E2).

It shall be appreciated that the signal transmission for the downlink synchronization and the uplink synchronization mentioned above aims to calculate the delay time offset of the frame between the UE 2 and the BS, and the time synchronization between the UE 2 and the BS aims to make the UE 2 adjust its clock (i.e., system time) to be as identical as possible to the internal clock of the BS based on the reference time information provided by the BS and the calculated time delay information. Moreover, the table TAB shown in FIG. 1 may be referred to Table 2 in "R2-1818254: "Time Synchronization for IIOT," NTT DOCOMO, INC., 3GPP TSG-RAN WG2 #104, Spoken, USA, 12-16 Nov. 2018". For simplification of the description, this embodiment only takes the cases of the large service area and the intra-gNB as examples. Since the aforementioned error types and their detailed causes could be appreciated by those of ordinary skill in the art based on the above descriptions, and thus will not be further described herein.

Figure 3:
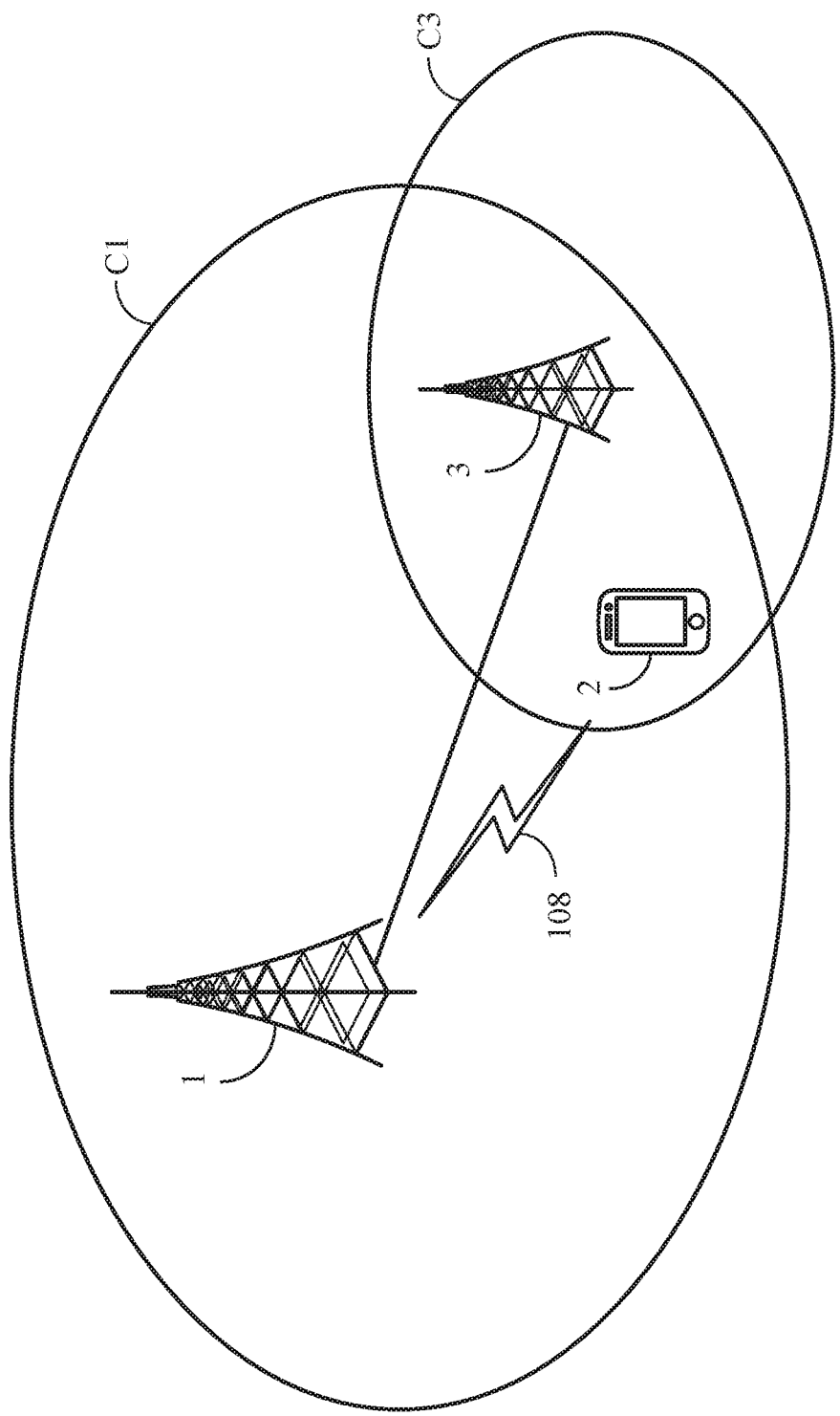
FIG. 3 depicts an implementation scenario of the signal transmission among the BS 1, the UE 2, and the secondary BS 3 according to the present invention.

As shown in FIG. 3, the UE 2 is within the signal coverage C1 of the primary BS 1 and the signal coverage C3 of the secondary BS 3 at the same time, and executes a carrier aggregation (CA) transmission or a dual connectivity transmission with both of the primary BS 1 and the secondary BS 3 at the same time. In this case, the UE 2 transmits the relevant processing time error information about the reception of the synchronization signal from the primary BS 1, the transmission of the preamble sequence to the primary BS 1, the reception of the synchronization signal from the secondary BS 3, and the transmission of the preamble sequence to the secondary BS 3. The processing time error information may include the first detection synchronization signal time error, the first preamble sequence transmission time error, the second detection synchronization signal time error, and the second preamble sequence transmission time error so that the primary BS 1 can calculate the first time synchronization error and the second time synchronization error accordingly.

It shall be appreciated that if the UE 2 executes the CA transmission with both of the primary BS 1 and the secondary BS 3 at the same time, the primary BS 1 and the secondary BS 3 would use different component carriers (CC). Besides, FIG. 3 illustrates that the signal coverage C1 of the primary BS 1 and the signal coverage C3 of the secondary BS 3 are partially overlapped; however, in other embodiments, the signal coverage C1 of the primary BS 1 may cover the whole signal coverage C3 of the secondary BS 3 (i.e., the signal coverage C3 is totally included in the signal coverage C1).

After calculating the first time synchronization error and the second time synchronization error, the primary BS 1 determines a smaller time synchronization error between the first time synchronization error and the second time synchronization error, and the smaller time synchronization error corresponds to a target BS. As appreciated from the above, the first time synchronization error and the second time synchronization error are associated with the SCSs of the primary BS 1 and the secondary BS 3 respectively. Thus, if the primary BS 1 and the secondary BS 3 have the same reference time information granularity error, the BS with the smaller SCS will be the target BS, i.e., the target BS may be one of the primary BS 1 and the secondary BS 3. Afterwards, as shown in FIG. 3, the primary BS 1 generates a synchronization indication message 108 indicating one of the primary BS 1 and the secondary BS 3, and transmits the synchronization indication message 108 to the UE 2 to instruct the UE 2 to receive the reference time information of the target BS from one of the primary BS 1 and the secondary BS 3 from the secondary BS 3 according to the synchronization indication message 108.

Figure 4A:
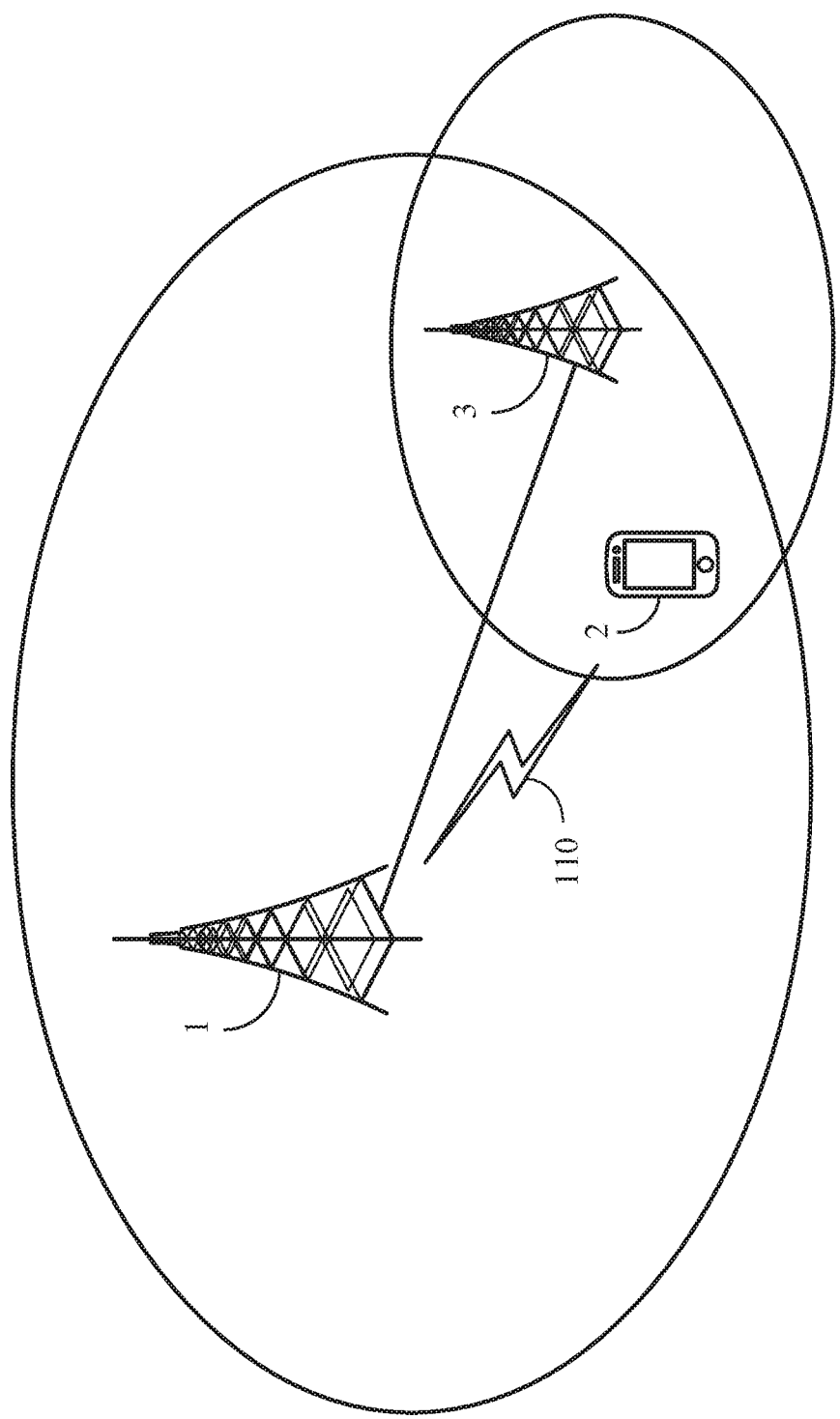
FIGS. 4A-4B depict an implementation scenario of the signal transmission among the BS 1, the UE 2, and the secondary BS 3 according to the present invention.

For example, when determines that the first time synchronization error is smaller than the second time synchronization error, the primary BS 1 will decide that the target BS is the primary BS 1. In this case, the primary BS 1 transmits its reference time information 110 to the UE 2 by itself or via the secondary BS 3. If the primary BS 1 and the secondary BS 3 have the same reference time information granularity error, the primary BS 1 can decide to transmit the reference time information 110 to the UE 2 by itself. Then, the UE 2 will receive the reference time information 110 from the primary BS 1 according to the synchronization indication message 108 and synchronize its time with the primary BS 1 based on the reference time information 110 of the primary BS 1, as shown in FIG. 4A.

Figure 4B:
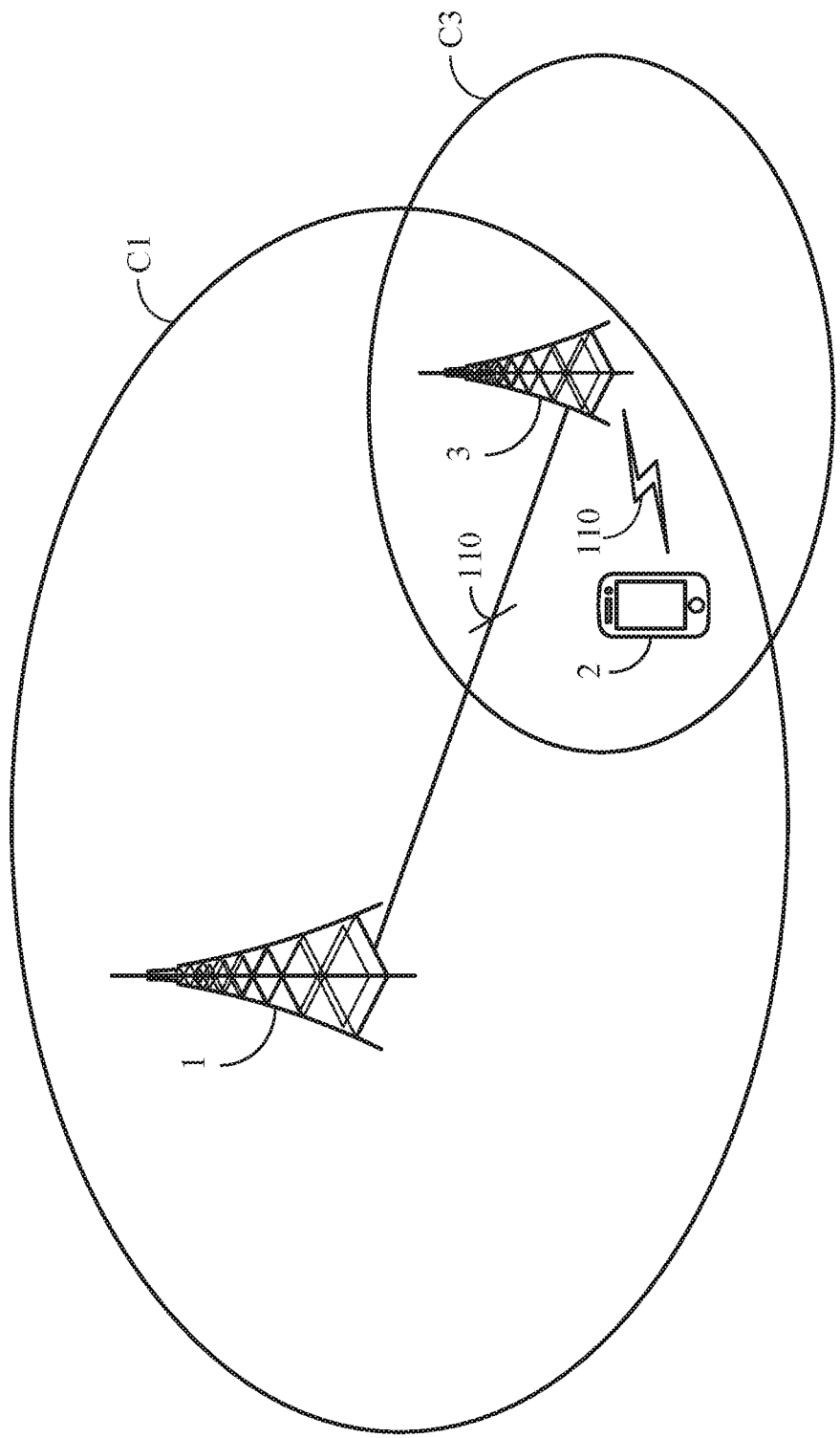

If the secondary BS 3 has the smaller reference time information granularity error as compared to the primary BS 1, then the primary BS 1 decides to transmit its reference time information 110 via the secondary BS 3. In this case, the primary BS 1 transmits its reference time information 110 to the secondary BS 3 first so that the secondary BS 3 can transmit the reference time information 110 to the UE 2. Therefore, the synchronization indication message 108 indicates that the UE 2 has to receive the reference time information 110 of the primary BS 1 from the secondary BS 3 for synchronizing its time with the primary BS 1 based on the reference time information 110 of the primary BS 1, as shown in FIG. 4B.

Figure 5:
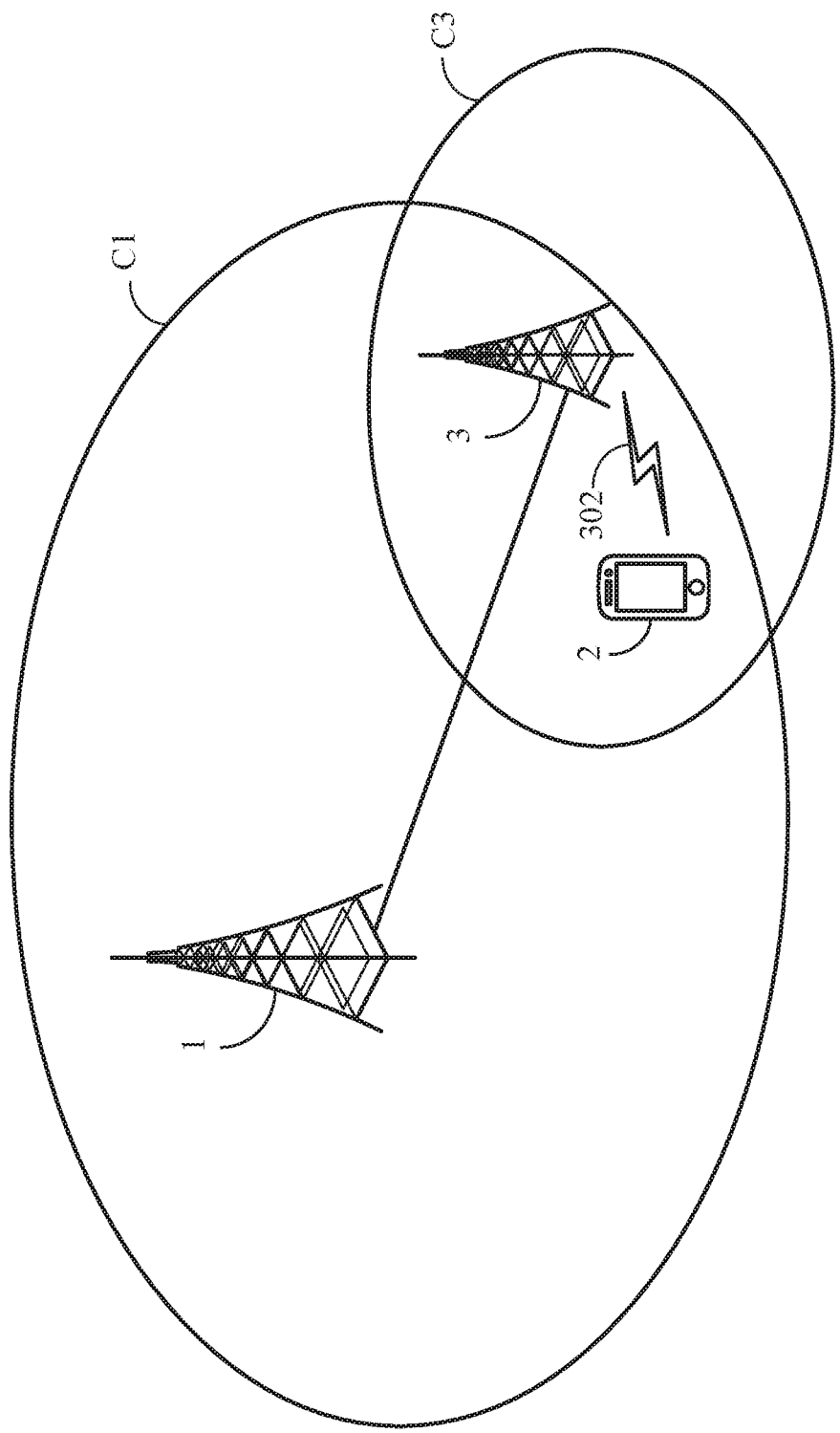
FIG. 5 depicts an implementation scenario of the signal transmission among the BS 1, the UE 2, and the secondary BS 3 according to the present invention.

In another example, if the primary BS 1 and the secondary BS 3 have the same reference time information granularity error, then the primary BS 1 determines that the second time synchronization error is smaller than the first time synchronization error, and decides that the target BS is the secondary BS 3. In this case, the synchronization indication message 108 indicates the secondary BS 3 to make the UE 2 receive the reference time information 302 of the secondary BS 3 from the secondary BS 3, as shown in FIG. 5. Each of the reference time information 110 and the reference time information 302 may be broadcasted through the SIB as the reference time information 104 described above. Similarly, each of the reference time information 110 and the reference time information 302 may also be unicasted through a UE-specific RRC message.

Figure 6:
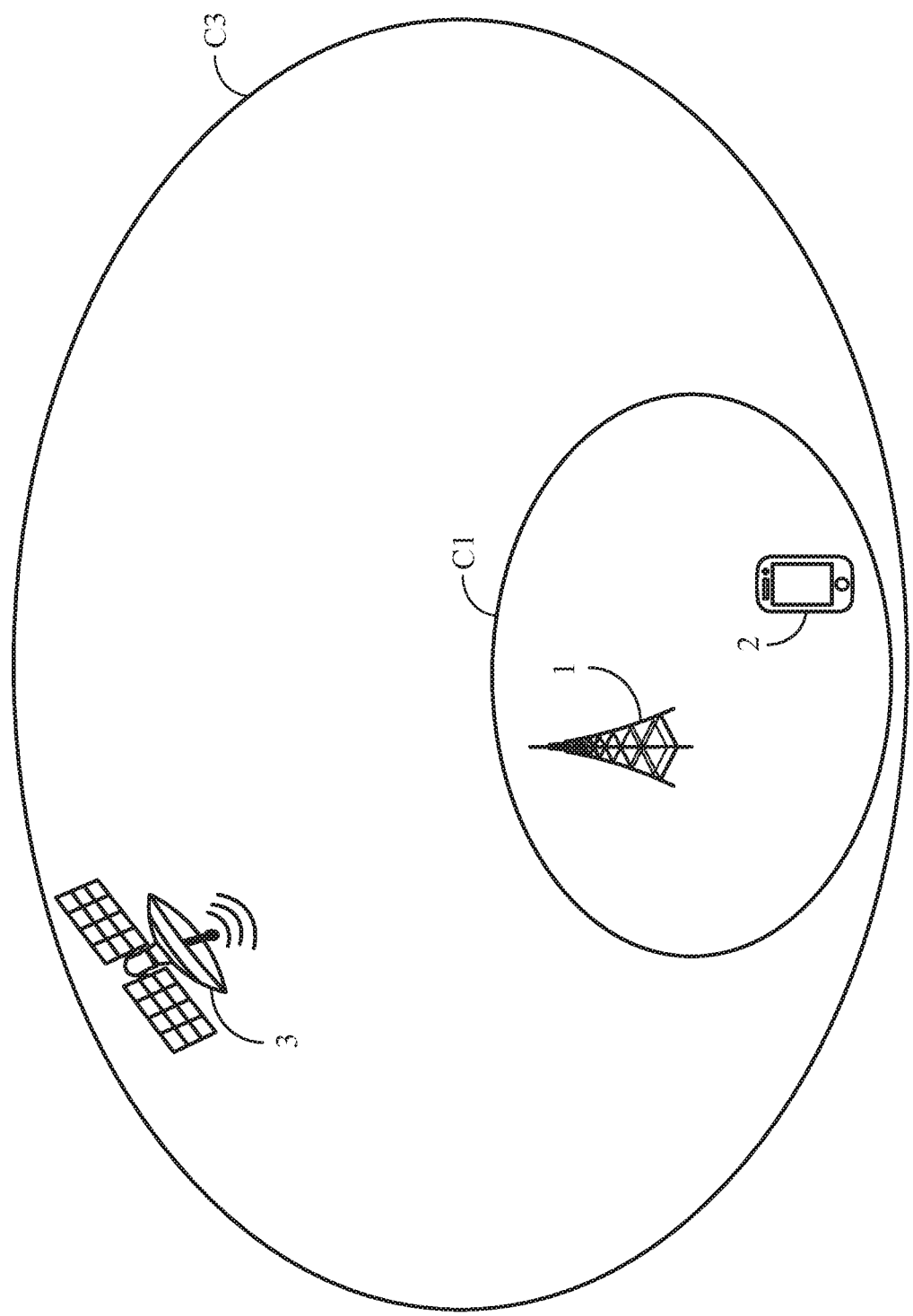
FIG. 6 depicts an implementation scenario of a BS being located on a satellite.
Figure 7:
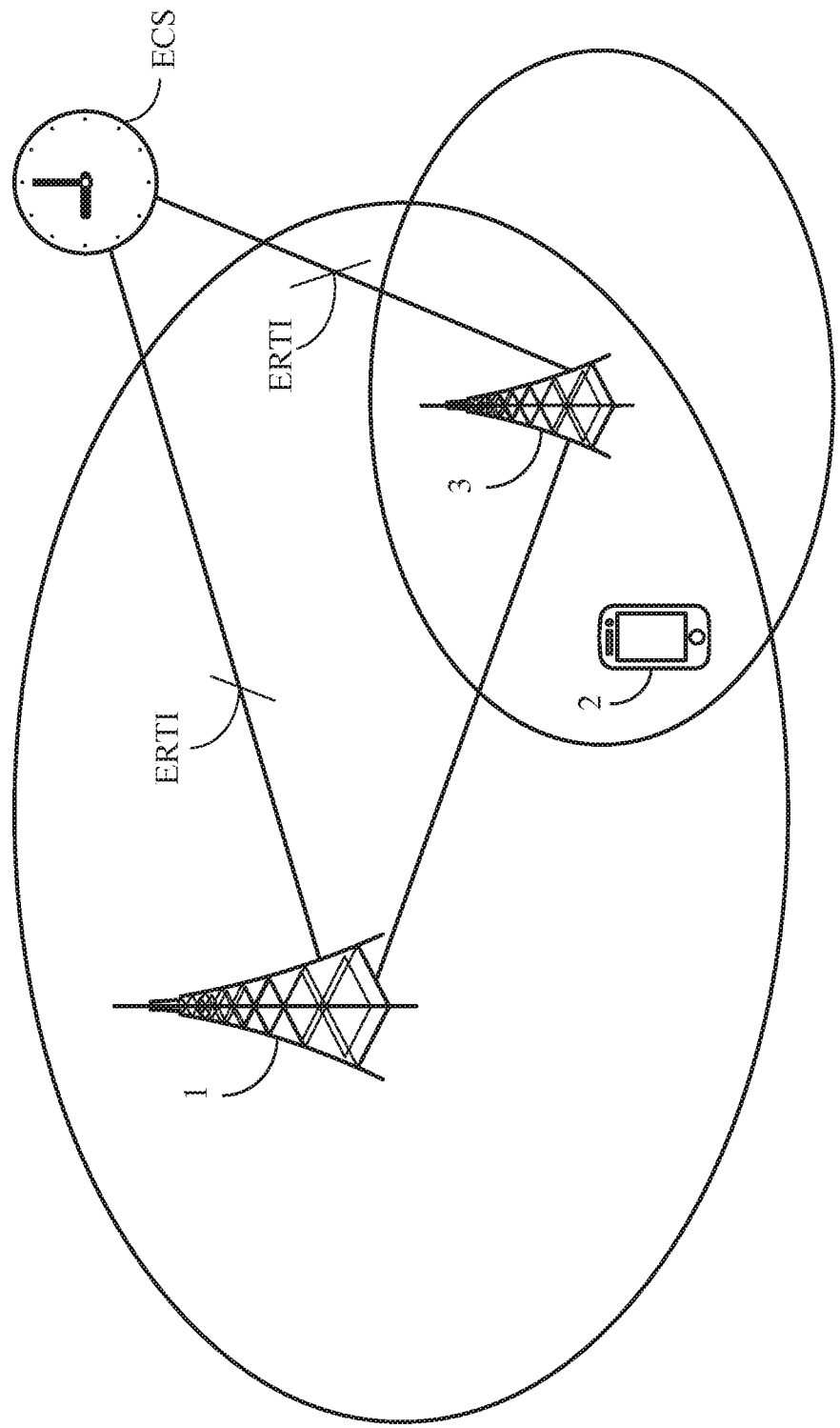
FIG. 7 depicts an implementation scenario of the signal transmission among the BS 1, the UE 2, and the secondary BS 3 according to the present invention.

In one embodiment, one of the primary BS 1 and the secondary BS 3 is located on a satellite. For example, as shown in FIG. 6, the secondary BS 3 is located on the satellite, and the primary BS 1 is located on the earth's surface. In another example, the primary BS 1 may be located on the satellite, and the secondary BS 3 may be located on the earth's surface. It shall be appreciated by those of ordinary skill in the art that the usable frequency bands of the 5G mobile communication system include the microwave frequency band, so it is feasible to place the BS on the satellite, and thus will not be further described herein.

Please refer to FIGS. 4A-4B, FIG. 5, and FIG. 7 for a second embodiment. The second embodiment is an extension of the first embodiment. This embodiment will describe the procedure about how the primary BS 1 decides the target BS in more detail.

In this embodiment, the primary BS 1 and the secondary BS 3 are connected to an external clock reference source ECS to receive an external reference time information ERTI, so the error types included in the first time synchronization error and the error types included in the second time synchronization error are the same. Since the time synchronization error will become smaller as the SCS becomes larger, the primary BS 1 can decide the target BS directly based on the determination of whether the first SCS is larger than the second SCS if the error types included in the first time synchronization error and the error types included in the second time synchronization error are the same. In other words, when the first SCS is larger than the second SCS, the primary BS 1 determines that the first time synchronization error is smaller than the second time synchronization error, and then decides that the target BS is the primary BS 1. Conversely, when the first SCS is smaller than the second SCS, the primary BS 1 determines that the first time synchronization error is larger than the second time synchronization error, and then decides that the target BS is the secondary BS 3.

The external clock source ECS may be a core network, and the external reference time information ERTI may be generated according to one of a grand master (GM) clock of the core network and a GM clock of a time-sensitive networking (TSN). Therefore, the primary BS 1 and the secondary BS 3 may receive the external reference time information ERTI from the core network. Besides, the external clock source ECS may be a satellite instead, so both the primary BS 1 and the secondary BS 3 may receive the external reference time information ERTI from the satellite when they both have a global navigation satellite system (GNSS) receiver.

For example, it is assumed that the first SCS of the primary BS 1 is 30 kHz and the second SCS of the secondary BS 3 is 15 kHz, so the first time synchronization error calculated by the primary BS 1 is 1750 ns and the second time synchronization error calculated by the primary BS 1 is 2144 ns. In this case, the primary BS 1 determines that the first time synchronization error is smaller than the second time synchronization error, and then decides that the target BS is the primary BS 1. As aforementioned, the reference time information 110 of the primary BS 1 can be transmitted to the UE 2 by the primary BS 1 itself (as shown in FIG. 4A) or via the secondary BS 3 (as shown in FIG. 4B).

In another example, it is assumed that the first SCS of the primary BS 1 is 15 kHz and the second SCS of the secondary BS 3 is 30 kHz, so the first time synchronization error calculated by the primary BS 1 is 2144 ns and the second time synchronization error calculated by the primary BS 1 is 1750 ns. In this case, the primary BS 1 determines that the second time synchronization error is smaller than the first time synchronization error, and then decides that the target BS is the secondary BS 3. Thus, the synchronization indication message 108 generated by the primary BS 1 indicates the secondary BS 3, and the UE 2 receives the reference time information 302 of the secondary BS 3 according to the synchronization indication message 108 (as shown in FIG. 5).

It shall be appreciated that the values of the first time synchronization error and the second time synchronization error are calculated based on Table 2 in 3GPP technical document "R2-1818254: "Time Synchronization for IIOT," NTT DOCOMO, INC., 3GPP TSG-RAN WG2 #104, Spoken, USA, 12-16 Nov. 2018", and are only for examples. In other words, the calculation basis and the values of the first time synchronization error and the second time synchronization error are only for purpose of illustration rather than to limit the present invention.

In addition, in one embodiment, the first time synchronization error further includes a first reference time information granularity error, and the second time synchronization error further includes a second reference time information granularity error. Therefore, when the first SCS of the primary BS 1 is equal to the second SCS of the secondary BS 3, the primary BS 1 may further determine whether the first reference time information granularity error of the primary BS 1 is larger than the second reference time information granularity error of the secondary BS 3.

In detail, the primary BS 1 may further determine whether the first SCS is larger than the second SCS, and determines whether the first reference time information granularity error of the primary BS 1 is larger than the second reference time information granularity error of the secondary BS 3. When the first SCS is equal to the second SCS and the first reference time information granularity of the primary BS 1 is smaller than the second reference time information granularity of the secondary BS 3, the primary BS 1 determines that the target BS is the primary BS 1. When the first SCS is equal to the second SCS and the first reference time information granularity of the primary BS 1 is larger than the second reference time information granularity of the secondary BS 3, the primary BS 1 determines that the target BS is the secondary BS 3.

For example, it is assumed that both of the first SCS and the second SCS are 15 kHz, the first reference time information granularity is 0.15 µs, and the second reference time information granularity is 0.1 µs. The primary BS 1 determines that the first reference time information granularity of the primary BS 1 is larger than the second reference time information granularity of the secondary BS 3, and determines that the target BS is the secondary BS 3 accordingly.

Moreover, when the first SCS is larger than the second SCS and the first reference time information granularity of the primary BS 1 is larger than the second reference time information granularity of the secondary BS 3, the primary BS 1 may transmit its reference time information to the secondary BS 3 to make the secondary BS 3 transmit the reference time information of the primary BS 1 if the primary BS 1 determines that the target BS is the primary BS 1 and makes the synchronization indication message 108 indicate the secondary BS 3. It can be understandable that since the second reference time information granularity of the secondary BS 3 is smaller than the first reference time information granularity of the primary BS 1, the reference time information granularity error can be minimized if the primary BS 1 transmits its reference time information 110 to the UE 2 via the secondary BS 3 so as to increase the accuracy of the reference time information of the primary BS 1.

It shall be appreciated that in the previous examples, the time error difference between the reference time information granularity errors of the primary BS 1 and the secondary BS 3 are assumed to be smaller than the time error difference due to the different SCSs in general cases, so the reference time information granularity errors may have the critical effects on the first and second time synchronization errors only when the SCSs of the primary BS 1 and the secondary BS 3 are the same. In other words, the reference time information granularity error has less influence on the time synchronization error in comparison with the detection synchronization signal time error and the propagation delay time estimation error which are associated with the SCS.

For example, it is assumed that the first reference time information granularity is 0.15 µs and the second reference time information granularity is 0.1 µs, so the time error difference between the first reference time information granularity and the second reference time information granularity calculated by the primary BS 1 is 25 ns (i.e., (0.15 µs−0.1 µs)/2=25 ns). Referring to the table TAB in FIG. 1, we can learn that the error factors (i.e., the detection synchronization signal time error and the propagation delay time estimation error) associated with the SCS cause the time error difference between different SCSs to be at least larger than 325 ns (i.e., 1750 ns−1426 ns=324 ns). Thus, the error factors associated with the SCS have significant influence on the first time synchronization error and the second time synchronization error.

Figure 8:
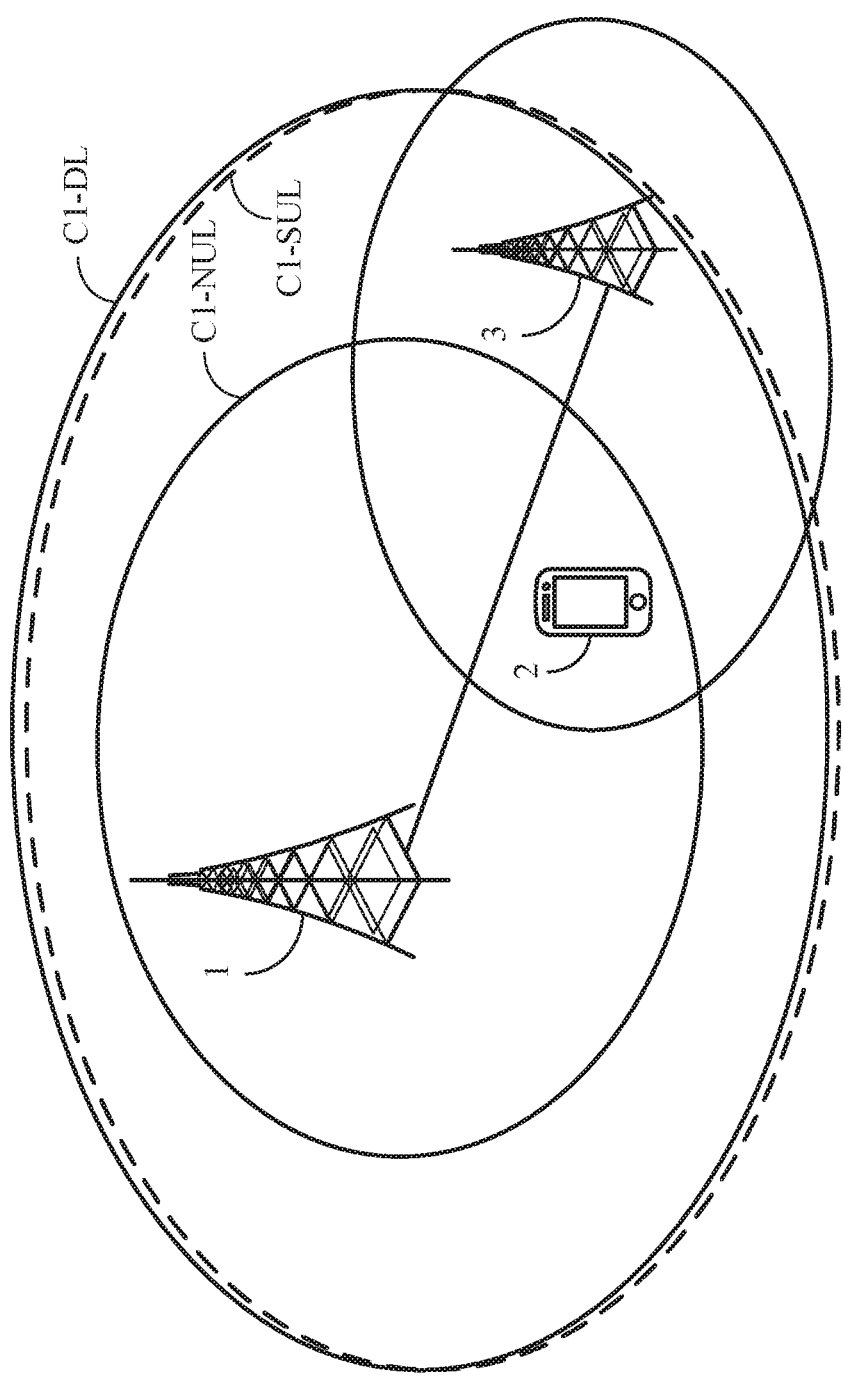
FIG. 8 is a schematic view of the BS 1 having a normal uplink frequency band, a supplementary uplink frequency band, and a downlink frequency band according to the present invention.

A third embodiment of the present invention is as shown in FIG. 8. The third embodiment is also an extension of the first embodiment. In this embodiment, it is assumed that the target BS is the primary BS 1, and the primary BS 1 provides a normal uplink (NUL) frequency band, a supplementary uplink (SUL) frequency band, and a downlink frequency band. A center frequency of the NUL frequency band is larger than a center frequency of the SUL frequency band, and a normal uplink signal coverage C1-NUL of the NUL frequency band is smaller than a supplementary uplink signal coverage C1-SUL of the SUL frequency band. A downlink signal coverage C1-DL of the downlink frequency band of the primary BS 1 may larger than the normal uplink signal coverage C1-NUL and smaller than the supplementary uplink signal coverage C1-SUL (but not limited thereto).

Before calculating the first time synchronization error, the primary BS 1 needs to determine a current location of the UE 2 to see if it is within both the normal uplink signal coverage C1-NUL and the supplementary uplink signal coverage C1-SUL, or only within the supplementary uplink signal coverage C1-SUL. When the current location of the UE 2 is within both the normal uplink signal coverage C1-NUL and the supplementary uplink signal coverage C1-SUL, the primary BS 1 determines whose SCS is larger between the normal uplink signal coverage C1-NUL and the supplementary uplink signal coverage C1-SUL larger, and calculates the first time synchronization error between the UE 2 and the primary BS 1 based on the frequency band with the larger SCS. Herein, the SCS of the NUL frequency band (e.g., 30 kHz) is assumed to be larger than the SCS (e.g., 15 kHz) of the SUL frequency band. Thus, the primary BS 1 calculates the first time synchronization error between the UE 2 and the primary BS 1 based on the SCS of the NUL frequency band.

Besides, it shall be appreciated by those of ordinary skill in the art that the primary BS 1 may calculate the first time synchronization error between the UE 2 and the primary BS 1 based on the SCS of the SUL frequency band if the primary BS 1 determines that the current location of the UE 2 only within the supplementary uplink signal coverage C1-SUL and the downlink signal coverage C1-DL (i.e., not within the normal uplink signal coverage C1-NUL).

In other embodiments, if the secondary 3 also provides a NUL frequency band and a SUL frequency band, the primary BS 1 needs to determine whose SCS is larger between the NUL frequency band and the SUL frequency band of the secondary 3 is larger when the UE 2 is within both the normal uplink signal coverage and the supplementary uplink signal coverage of the secondary 3, and calculates the second time synchronization error between the UE 2 and the secondary 3 based on the frequency band with the larger SCS.

Figure 9:
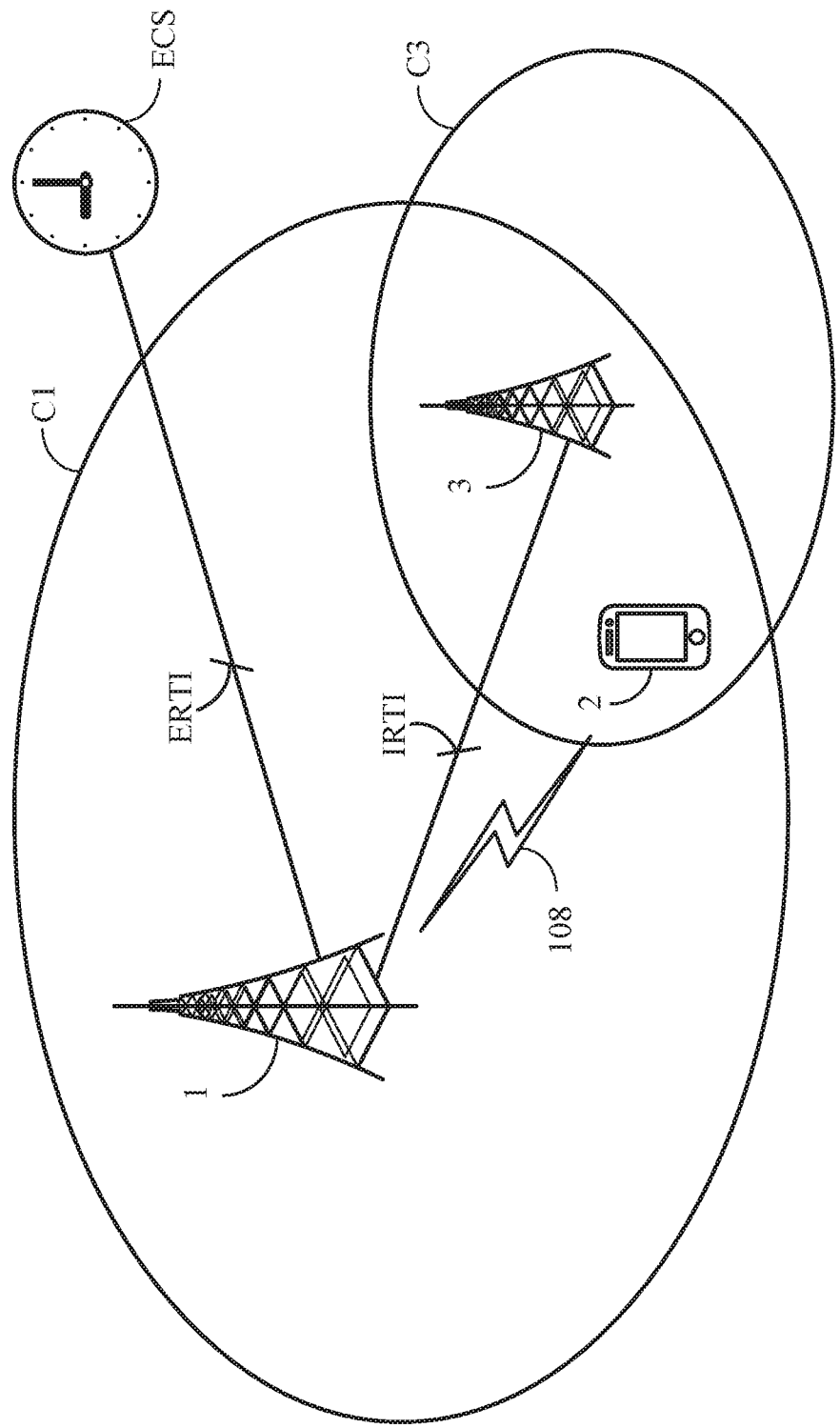
FIG. 9 depicts an implementation scenario of the signal transmission among the BS 1, the UE 2, and the secondary BS 3 according to the present invention.
Figure 10A:
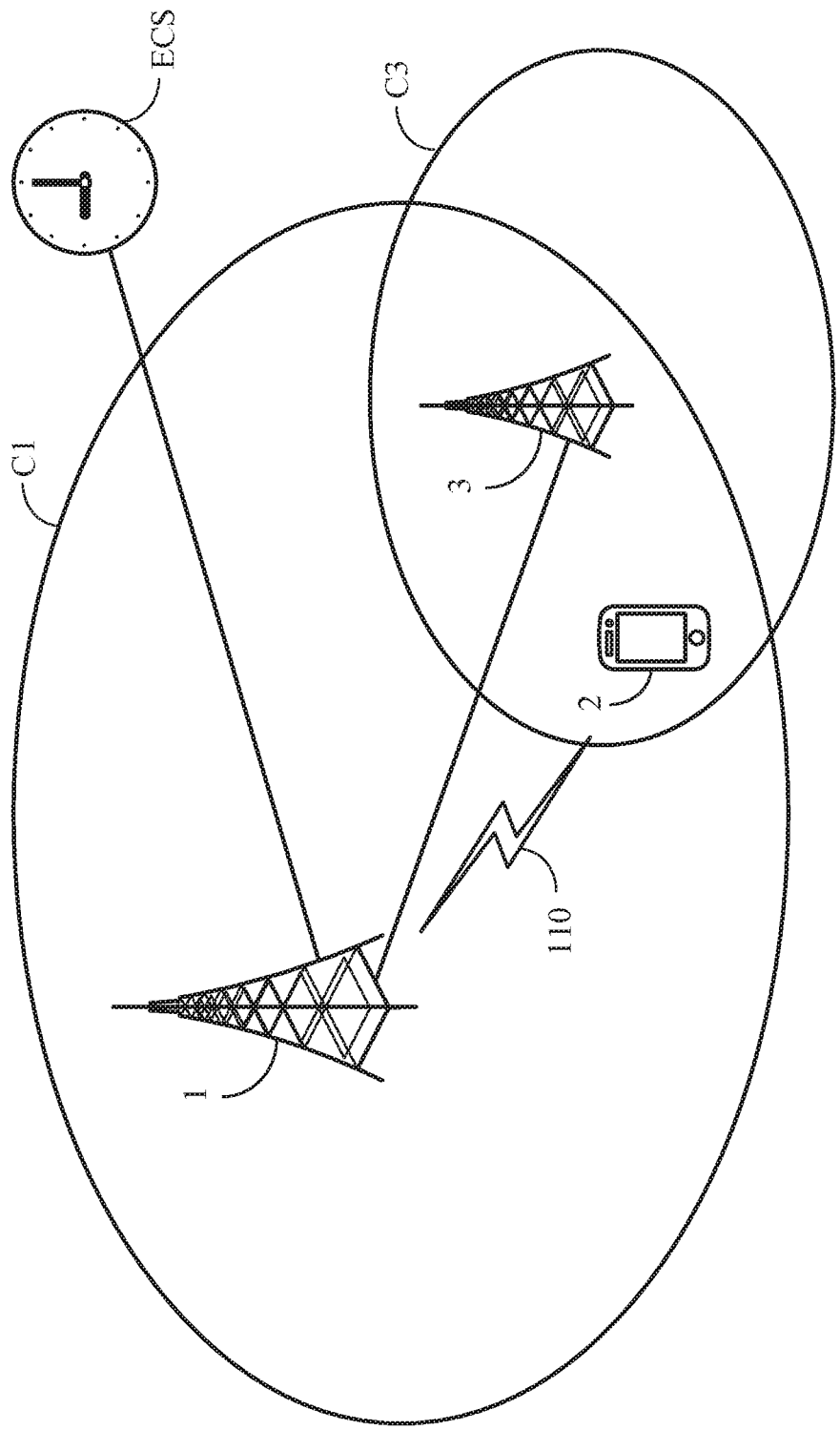
FIGS. 10A-10B depict an implementation scenario of the signal transmission among the BS 1, the UE 2, and the secondary BS 3 according to the present invention.
Figure 10B:
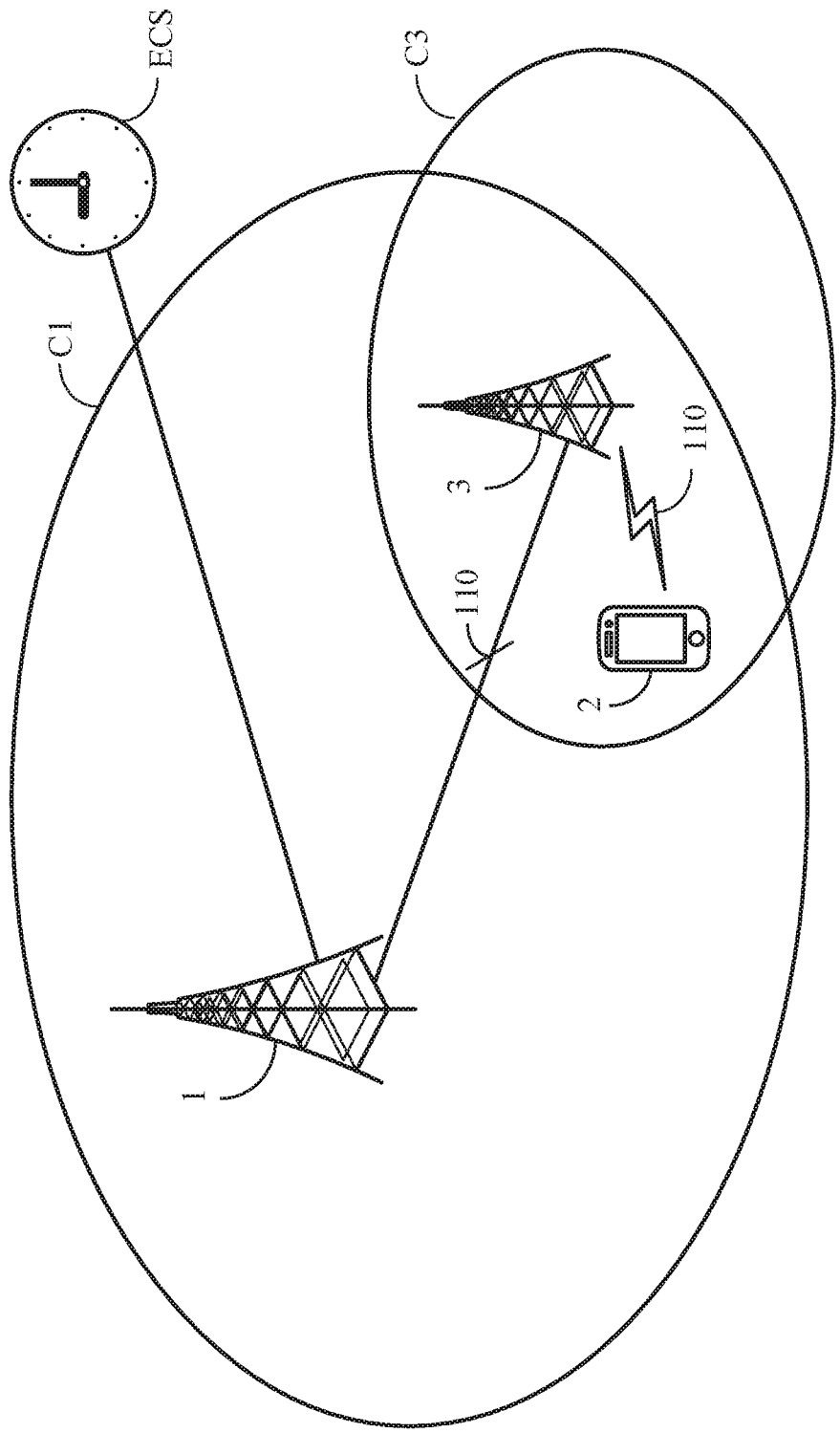
Figure 11:
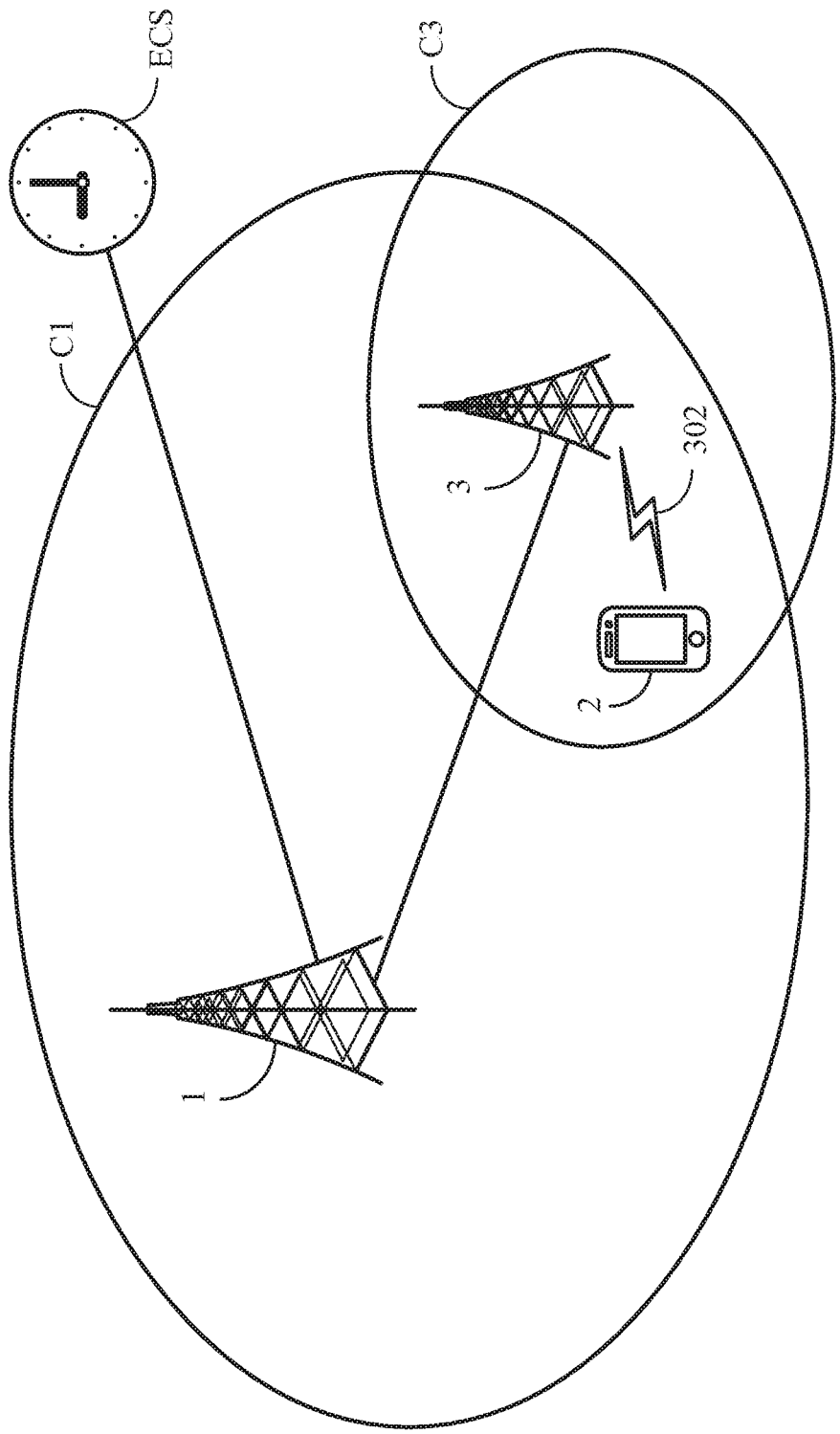
FIG. 11 depicts an implementation scenario of the signal transmission among the BS 1, the UE 2, and the secondary BS 3 according to the present invention.

A fourth embodiment of the present invention is as shown in FIGS. 9-11. The fourth embodiment is also an extension of the first embodiment. Different from the second embodiment, in this embodiment, only the primary BS 1 receives the external reference time information ERTI from the external clock source ECS, while the secondary 3 needs to receive the reference time information from the primary BS 1 (i.e., an internal reference time information IRTI generated by the primary BS 1).

Similarly, the external clock source ECS may be the core network, and the external reference time information ERTI may be generated based on one of the GM clock of the core network and the GM clock of the time-sensitive networking (TSN). Besides, the external clock source ECS may be a satellite instead, and, the primary BS 1 may receive the external reference time information ERTI from the satellite when the primary BS 1 has the GNSS receiver.

After receiving the external reference time information ERTI, the primary BS 1 generates the internal reference time information IRTI and transmits the internal reference time information IRTI to the secondary BS 3. In this case, the second time synchronization error further includes a transmission hop time error due to the transmission of the internal reference time information IRTI from the primary BS 1 to the secondary BS 3. The transmission hop time error is a time synchronization error based on a precision time protocol (PTP), and the time synchronization error can be controlled to a level less than 40 ns based on the PTP.

Similar to the second embodiment, it is assumed that the first SCS of the primary BS 1 is 15 kHz and the second SCS of the secondary BS 3 is 30 kHz, so the primary BS 1 determines that the second SCS is larger than the first SCS. When the second SCS is larger than the first SCS, the primary BS 1 further determines whether the second time synchronization error is smaller than the first time synchronization error. However, different from the second embodiment, the second time synchronization error in this embodiment should include the transmission hop time error (i.e., 40 ns) due to the transmission hop from the primary BS 1 to the secondary BS 3. Therefore, the second time synchronization error is 1790 ns (i.e., 1750 ns+40 ns) in this embodiment.

It can be seen from above that the second time synchronization error (i.e., 1790 ns) is still smaller than the first time synchronization error (i.e., 2144 ns) even including the transmission hop time error, so the primary BS 1 determines that the target BS is the secondary BS 3. In this case, the synchronization indication message 108 indicates the secondary BS 3. Conversely, the primary BS 1 will determine that the target BS is the primary BS 1 and the synchronization indication message 108 will indicate the primary BS 1 when the second time synchronization error including the transmission hop time error is larger than the first time synchronization error. It shall be appreciated by those of ordinary skill in the art that it would be a rare case that the second time synchronization error including the transmission hop time error is equal to the first time synchronization error; however, the primary BS 1 may determine that the target BS is the primary BS 1 directly according to a preset settings and the synchronization indication message 108 indicates the primary BS 1 if this rare case happens.

In other embodiment, when the second SCS is equal to or smaller than the first SCS, the primary BS 1 may directly determine that the first time synchronization error is smaller than the second time synchronization error and the target BS is the primary BS 1. In this case, the synchronization indication message 108 indicates the primary BS 1. In other words, when the second SCS is equal to or smaller than the first SCS, the second time synchronization error including the transmission hop time error is definitely larger than the first time synchronization error.

Similarly, when the target BS is the primary BS 1, the reference time information 110 of the primary BS 1 can be transmitted to the UE 2 by the primary BS 1 itself or via the secondary BS 3, as shown in FIGS. 10A and 10B. When the target BS is the secondary BS 3, the synchronization indication message 108 indicates the secondary BS 3 to make the UE 2 receive the reference time information 302 of the secondary BS 3 from the secondary BS 3 according to the synchronization indication message 108, as shown in FIG. 11.

Please refer to FIGS. 9-11 again for a fifth embodiment. The fifth embodiment is an extension of the fourth embodiment. In this embodiment, the first time synchronization error further includes a first reference time information granularity error, and the second time synchronization error further includes a second reference time information granularity error. In addition to determining whether the second SCS is larger than the first SCS, the primary BS 1 should further determine whether the first reference time information granularity of the primary BS 1 is larger than the second reference time information granularity of the secondary BS 3.

When the second SCS is equal to the first SCS and the first reference time information granularity of the primary BS 1 is larger than the second reference time information granularity of the secondary BS 3, the primary BS 1 calculates a time error difference between the first reference time information granularity of the primary BS 1 and the second reference time information granularity of the secondary BS 3. The primary BS 1 determines that the target BS is the primary BS 1 when the time error difference is smaller than the transmission hop time error.

For example, it is assumed that both of the first SCS and the second SCS are 15 kHz, the first reference time information granularity is 0.15 μs, the second reference time information granularity is 0.1 μs, and the transmission hop time error is 40 ns. The time error difference between the first reference time information granularity and the second reference time information granularity calculated by the primary BS 1 is 25 ns (i.e., (0.15 μs−0.1 μs)/2=25 ns). Since 25 ns is smaller than 40 ns, the primary BS 1 determines that the target BS is the primary BS 1. In other words, although the secondary BS 3 can provide more precise reference time information because the second reference time information granularity of the secondary BS 3 is smaller than the first reference time information granularity of the primary BS 1; however, since the time error difference between the first reference time information granularity and the second reference time information granularity is only 25 ns which is not larger than 40 ns of the transmission hop time error, it still can minimize the time synchronization error between the UEs by taking the primary BS 1 as the target BS after comparing their time synchronization errors as a whole.

Similarly, when the target BS is the primary BS 1, the reference time information 110 of the primary BS 1 can be transmitted to the UE 2 by the primary BS 1 itself or via the secondary BS 3, as shown in FIGS. 10A and 10B. However, it can be understandable that since the second reference time information granularity of the secondary BS 3 is smaller than the first reference time information granularity of the primary BS 1, the reference time information granularity error can be minimized if the reference time information 110 of the primary BS 1 is transmitted to the UE 2 via the secondary BS 3 so as to increase the precision of the received reference time information 110 of the primary BS 1.

Figure 12:
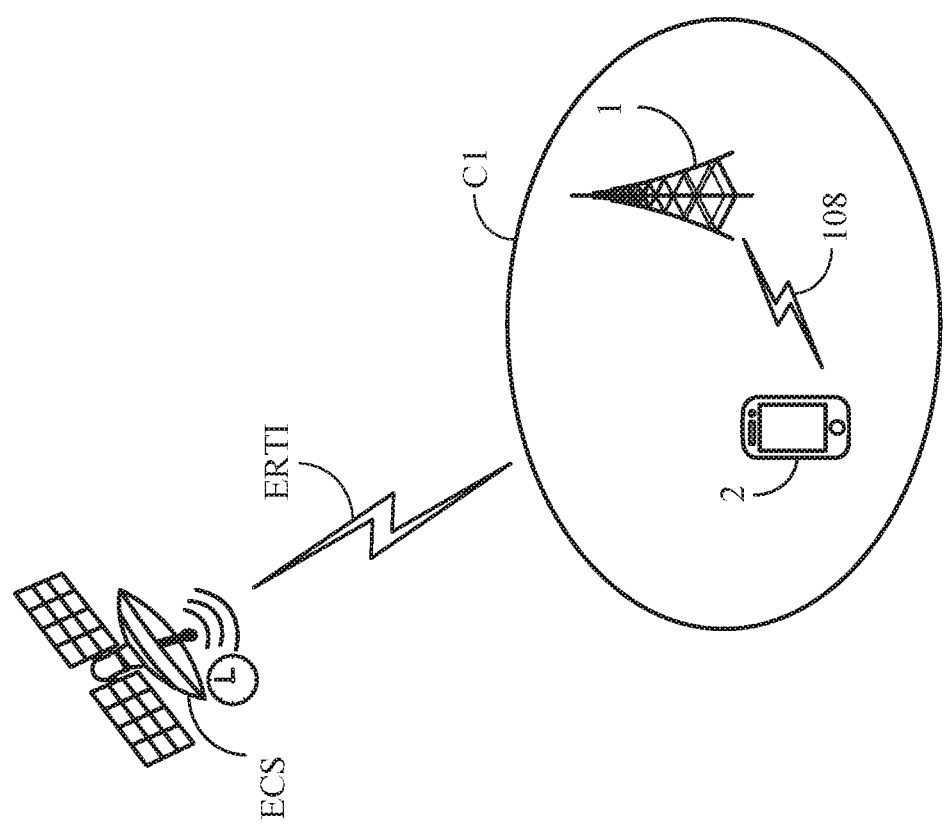
FIGS. 12-13 depict an implementation scenario of data transmission among the BS 1, UE 2, and the satellite ESC according to the present invention.
Figure 13:
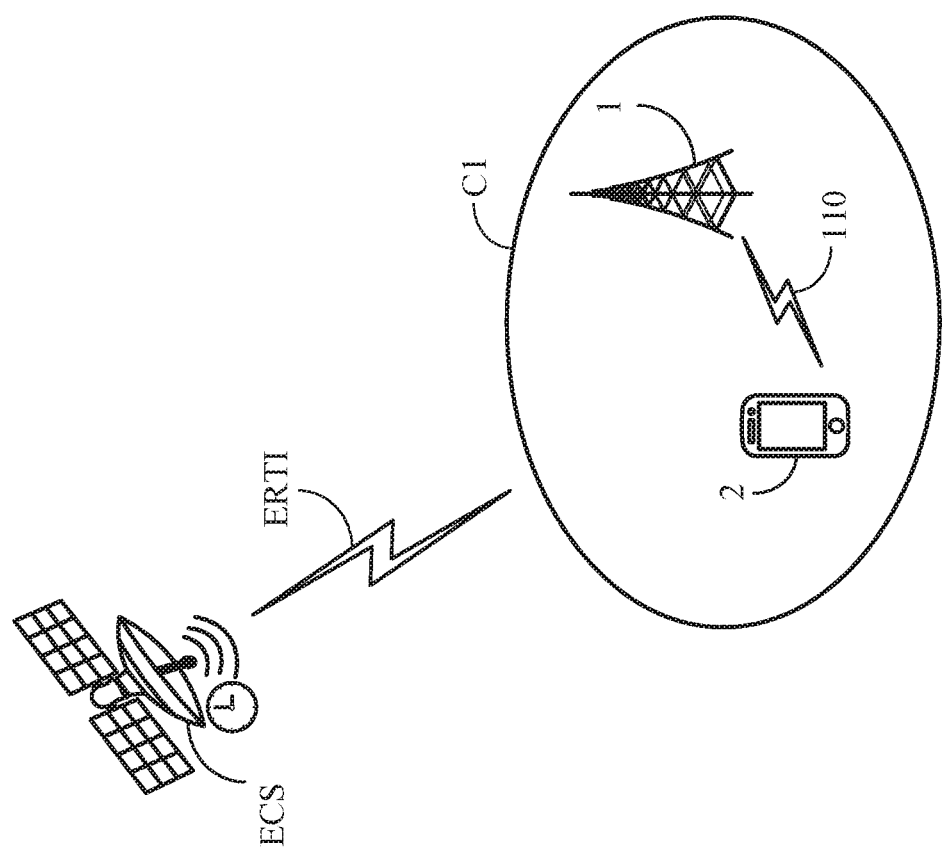

A sixth embodiment of the present invention is as shown in FIGS. 12-13. Different from the previous embodiments, the external clock source ESC in this embodiment is a satellite. The BS 1 may receive the external reference time information ERTI from the satellite ESC via the GNSS receiver and the UE 2 may receive the external reference time information ERTI from the satellite ESC via its GNSS receiver too. The BS 1 calculates the first time synchronization error between the UE 2 and the BS 1, and calculates the second time synchronization error between the UE 2 and the satellite.

Similarly, the first time synchronization error may include time errors which are associated with or irrelevant to the SCS. The time errors associated with the SCS of the BS including the detection synchronization signal time error caused by the UE (i.e., the error factor E1.2) and the propagation delay time estimation error (i.e., the error factor E1.3). The propagation delay time estimation error may further include the preamble sequence transmission time error caused by the UE (i.e., the error factor E1.3.1), the preamble sequence detection time error caused by the BS (i.e., the error factor E1.3.2), and the TA granularity time error (i.e., the error factor E1.3.3). The time errors irrelevant to the SCS of the BS may include the transmission synchronization signal time error caused by the BS (i.e., the error factor E1.1) and the reference time information granularity time error (i.e., the error factor E2). Since the calculation of the first time synchronization error is the same as the calculation in the second embodiment, and thus it will not be further described herein.

Furthermore, the UE 2 may obtain the reference time information by measuring signals transmitted by the satellite ESC and report the measuring time error information to the BS 1. It is emphasized here that the related information about the propagation delay time between UE 2 and the BS 1 can be obtained through the signal transmission (i.e., the downlink synchronization signal 102, the preamble sequence 202, and the TA message 106) between the UE 2 and the BS 1, but by contrast, the related information about the propagation delay time between the UE 2 and the satellite ESC is hard to be obtained since the UE 2 merely measures the signals transmitted by the satellite ESC directly, thus causing the time information error. In this situation, the BS 1 may estimate the propagation delay time according to the satellite orbit information, the azimuth information and the coordination of the UE 2, and calculates the second time synchronization error according to the estimated propagation delay time.

When the first time synchronization error is larger than or equal to the second time synchronization error, the BS 1 generates the synchronization indication message 108 and transmits the synchronization indication message 108, indicating the satellite ECS, to the UE 2. In this way, the UE 2 receives the external reference time information ERTI from the satellite ESC according to the synchronization indication message 108, and synchronizes its time based on the external reference time information ERTI, as shown in FIG. 12. When the first time synchronization error is smaller than the second time synchronization error, the synchronization indication message 108 indicates the BS 1 to make the UE 2 receive the reference time information 110 of the BS 1 from the BS 1 according to the synchronization indication message 108, and synchronizes its time based on the reference time information 110, as shown in FIG. 13.

In one embodiment, the BS 1 further receives a piece of processing time error information from the UE 2, and obtains the first detection synchronization signal time error and the first preamble sequence transmission time error according to the processing time error information.

Figure 14:
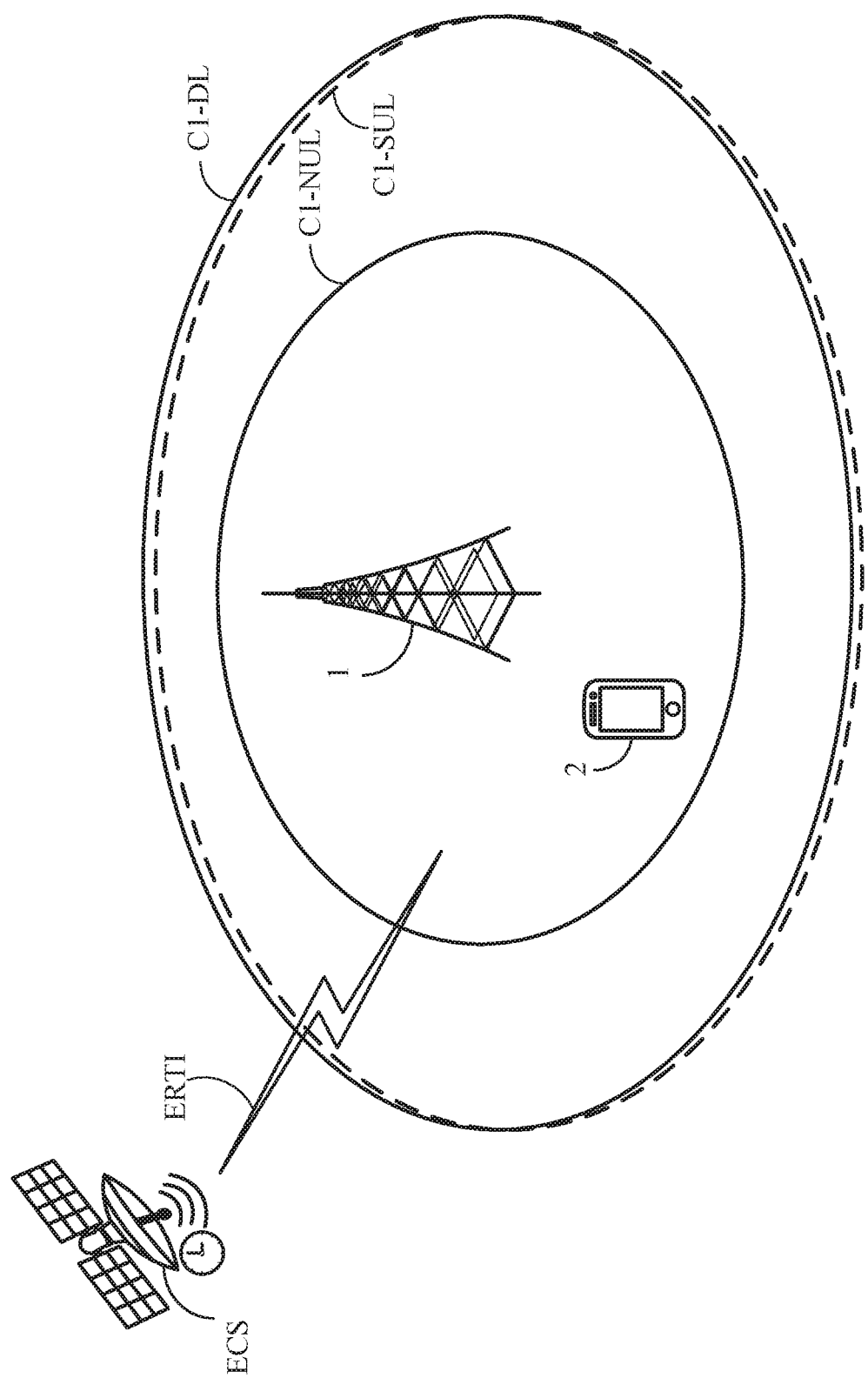
FIG. 14 is a schematic view of the BS 1 having a normal uplink frequency band, a supplementary uplink frequency band, and a downlink frequency band according to the present invention.

A seventh embodiment of the present invention is as shown in FIG. 14. The seventh embodiment is an extension of the sixth embodiment. Similar to the third embodiment, the BS 1 provides the NUL frequency band and the SUL frequency band. The center frequency of the NUL frequency band is larger than the center frequency of the SUL frequency band, the normal uplink signal coverage C1-NUL of the NUL frequency band is smaller than the supplementary uplink signal coverage C1-SUL of the SUL frequency band, and the SCS of the NUL frequency band is larger than the SCS of the SUL frequency band.

Likewise, the BS 1 needs to determine a current location of the UE 2 before calculating the first time synchronization error. When the current location of the UE 2 is within both the normal uplink signal coverage C1-NUL and the supplementary uplink signal coverage C1-SUL, the BS 1 calculates the first time synchronization error between the UE 2 and the BS 1 based on the SCS of the NUL frequency band.

Figure 15:
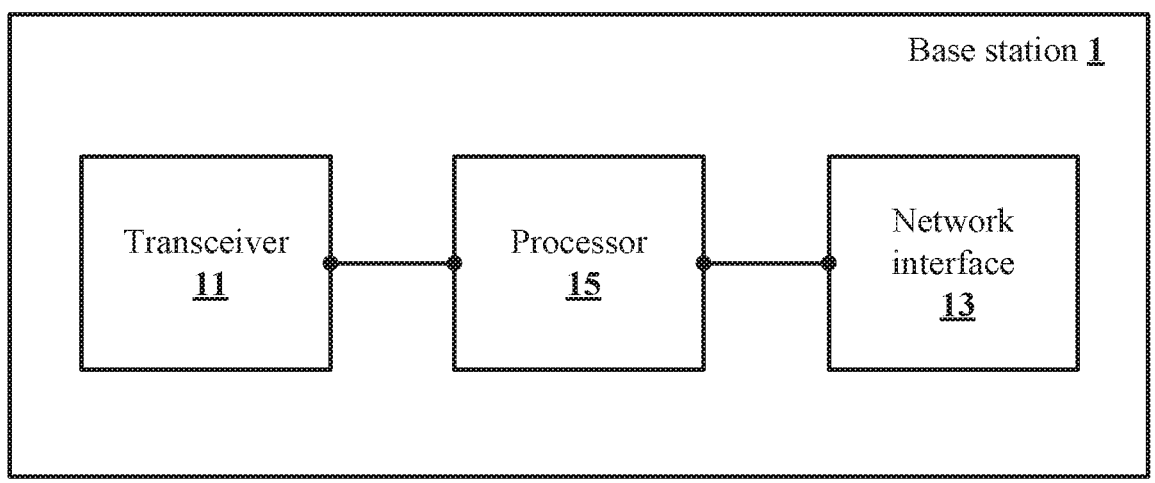
FIG. 15 is a schematic view of the BS 1 according to the present invention.

An eighth embodiment of the present invention is as shown in FIG. 15, which is a schematic view of the BS 1 according to the present invention. The BS 1 in the 5G mobile communication system is usually called a "gNB." The BS is a primary BS for a user equipment (UE), e.g., the UE 2 described in the previous embodiments. The BS 1 includes a transceiver 11, a network interface 13, and a processor 15. The processor 15 is electrically connected to the transceiver 11 and the network interface 13. The network interface 13 connects to a secondary BS, e.g., the secondary BS 3 described in the previous embodiments. The processor 15 may be any of various processors, Central Processing Units (CPUs), microprocessors, digital signal processors, or other computing devices known to those of ordinary skill in the art. It shall be appreciated that, for simplifying the description, other components of the BS 1 such as the storage, the housing, the power supply module and other components which are less relevant to the present invention are omitted from depiction in the drawings.

Corresponding to the first embodiment, the process 15 calculates a first time synchronization error between the UE 1 and the BS 1. The first time synchronization error is associated with a first subcarrier spacing (SCS) of the BS 1. The process 15 calculates a second time synchronization error between the UE 2 and the secondary BS 3. The second time synchronization error is associated with a second SCS of the secondary BS 3. Next, the process 15 determines a smaller time synchronization error between the first time synchronization error and the second time synchronization error, wherein the smaller time synchronization error corresponds to a target BS, and the target BS is one of the BS 1 and the secondary BS 3. Then, the process 15 generates a synchronization indication message which indicates one of the BS 1 and the secondary BS 3. The process 15 transmits the synchronization indication message to the UE 2 via the transceiver 11 to make the UE 2 to receive a piece of reference time information of the target BS from one of the BS 1 and the secondary BS 3.

In one embodiment, the first time synchronization error includes at least one of a first detection synchronization signal time error caused by the UE and a first propagation delay time estimation error which are associated with the first SCS, and the second time synchronization error includes at least one of a second detection synchronization signal time error caused by the UE and a second propagation delay time estimation error which are associated with the second SCS.

Besides, in one embodiment, the first propagation delay time estimation error includes at least one of a first preamble sequence transmission time error caused by the UE, a first preamble sequence detection time error caused by the BS, and a first timing advance granularity time error, and the second propagation delay time estimation error includes at least one of a second preamble sequence transmission time error caused by the UE, a second preamble sequence detection time error caused by the BS, and a second timing advance granularity time error.

In one embodiment, the process 15 further receives a piece of processing time error information from the UE 2 via the transceiver 11, and the processor 15 obtains the first detection synchronization signal time error, the first preamble sequence transmission time error, the second detection synchronization signal time error, and the second preamble sequence transmission time error according to the processing time error information.

In one embodiment, the BS 1, in cooperation with the secondary BS 3, performs the carrier aggregation (CA) transmission with the UE 2. The BS 1 uses a first component carrier (CC), and the secondary BS 3 uses a second CC. Besides, in another embodiment, the BS 1, in cooperation with the secondary BS 3, performs the dual connectivity (DC) transmission with the UE 2.

In one embodiment, one of the BS 1 and the secondary BS 3 is located on a satellite.

Corresponding to the second embodiment, the process 15 determines whether the first SCS is larger than the second SCS. When the first SCS is larger than the second SCS, the process 15 determines that the first time synchronization error is smaller than the second time synchronization error-larger and the target BS is the BS 1. Moreover, the process 15 determines that the first time synchronization error is larger than the second time synchronization error and the target BS is the secondary BS 3 when the first SCS is smaller than the second SCS.

In one embodiment, the first time synchronization error further includes a first reference time information granularity error, and the second time synchronization error further includes a second reference time information granularity error. In this case, the process 15 determines whether the first SCS is larger than the second SCS, and determines whether a first reference time information granularity of the BS 1 is larger than a second reference time information granularity of the secondary BS 3. When the first SCS is equal to the second SCS and the first reference time information granularity of the BS 1 is smaller than the second reference time information granularity of the secondary BS 3, the processor 15 determines that the target BS is the BS 1. When the first SCS is equal to the second SCS and the first reference time information granularity of the BS 1 is larger than the second reference time information granularity of the secondary BS 3, the processor 15 determines that the target BS is the secondary BS 3.

Further, when the second SCS is larger than the first SCS and the first reference time information granularity of the BS is larger than the second reference time information granularity of the secondary BS, the BS 1 transmits its reference time information to the secondary BS 3 to make the secondary BS 3 transmits the reference time information of the BS 1 to the UE 2 if the processor 15 determines that the target BS is the BS 1 and make the synchronization indication message indicate the secondary BS 3.

Corresponding to the third embodiment, the BS 1 provides a normal uplink (NUL) frequency band and a supplementary uplink (SUL) frequency band. A center frequency of the NUL frequency band is larger than a center frequency of the SUL frequency band. A normal signal coverage of the NUL frequency band is smaller than a supplementary signal coverage of the SUL frequency band. A SCS of the NUL frequency band is larger than a SCS of the SUL frequency band. The processor 15 further determines whether a current location of the UE 2 is within both the normal signal coverage and the supplementary signal coverage, and calculates the first time synchronization error between the UE 2 and the BS 1 based on the SCS of the NUL frequency band when the current location is within both the normal signal coverage and the supplementary signal coverage.

Corresponding to the fourth embodiment, the processor 15 further receives a piece of external reference time information to generate a piece of internal reference time information and transmit the internal reference time information to the secondary BS 3 via the network interface 13. Thus, the second time synchronization error further includes a transmission hop time error due to a transmission hop from the BS to the secondary BS. In one embodiment, the transmission hop time error is a time synchronization error based on a precision time protocol (PTP).

In addition, the processor 15 further determines whether the second SCS is larger than the first SCS. When the second SCS is larger than the first SCS, the processor 15 determines whether the second time synchronization error including the transmission hop time error is smaller than the first time synchronization error. When the second time synchronization error including the transmission hop time error is smaller than the first time synchronization error, the processor 15 determines that the target BS is the secondary BS 3, and the synchronization indication message indicates the secondary BS 3. On the contrary, when the second time synchronization error including the transmission hop time error is larger than the first time synchronization error, the processor 15 determines that the target BS is the BS 1, and the synchronization indication message indicates the BS 1. Moreover, when the second SCS is equal to or smaller than the first SCS, the processor 15 determines that the first time synchronization error is smaller than the second time synchronization error, the target BS is the BS 1, and the synchronization indication message indicates the BS 1.

In one embodiment, the network interface 13 further connects to a core network, and the processor 15 further receives the external reference time information from the core network via the network interface 13. The external reference time information is generated based on one of a grand master (GM) clock of the core network and a GM clock of a time-sensitive networking (TSN).

In one embodiment, the BS 1 further includes a global navigation satellite system (GNSS) receiver, and the processor 15 further receives the external reference time information from a satellite via the GNSS receiver.

Corresponding to the fifth embodiment, the first time synchronization error further includes a first reference time information granularity error, and the second time synchronization error further includes a second reference time information granularity error. The processor 15 further determines whether the second SCS is larger than the first SCS, and determines whether a first reference time information granularity of the BS 1 is larger than a second reference time information granularity of the secondary BS 3. When the second SCS is equal to the first SCS and the first reference time information granularity of the BS 1 is larger than the second reference time information granularity of the secondary BS 3, the processor 15 further calculates a time error difference between the first reference time information granularity of the BS 1 and the second reference time information granularity of the secondary BS 3. Then, the processor 15 determines whether the time error difference is smaller than the transmission hop time error. The processor 15 determines that the target BS is the BS 1 when the time error difference is smaller than the transmission hop time error.

In one embodiment, when the second SCS is equal to the first SCS and the first reference time information granularity of the BS is larger than the second reference time information granularity of the secondary BS, the processor 15 determines that the target BS is the BS 1 and the synchronization indication message indicates the secondary BS 3. In this case, the processor 15 further transmits the reference time information of the BS 1 to the secondary BS 3 to make the secondary BS 3 transmit the reference time information of the BS 1 to the UE 2.

Figure 16:
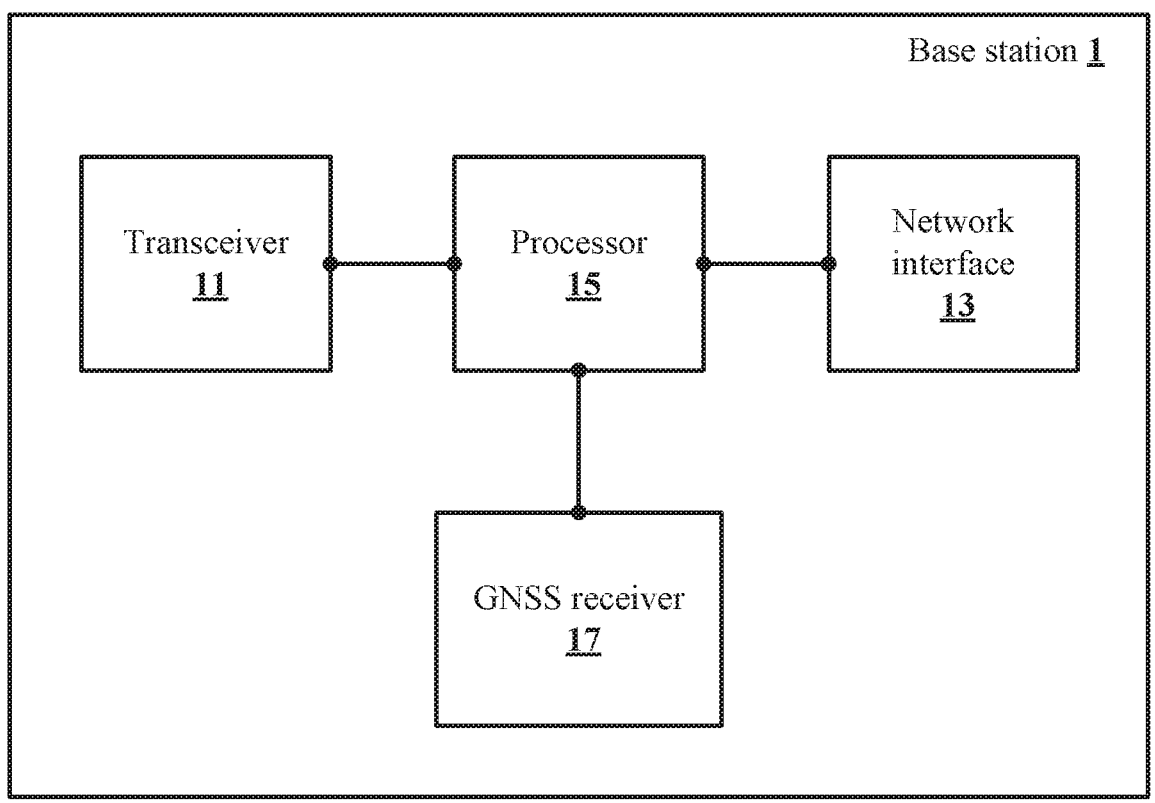
FIG. 16 is a schematic view of the BS 1 according to the present invention.

A ninth embodiment of the present invention is as shown in FIG. 16. In this embodiment, the BS 1 further includes a global navigation satellite system (GNSS) receiver 17. The processor 15 is further electrically connected to the GNSS receiver 17. Corresponding to the sixth embodiment, processor 15 receives a piece of external reference time information from a satellite (e.g., the external clock source ECS) via the GNSS receiver 17. The processor 15 calculates a first time synchronization error between the UE 2 and the BS 1, and calculates a second time synchronization error between the UE 2 and the satellite ECS. The processor 15 determines whether the first time synchronization error is smaller than the second time synchronization error to generate a synchronization indication message.

When the first time synchronization error is smaller than the second time synchronization error, the synchronization indication message indicates the BS 1 to make the UE 2 to receive a piece of reference time information of the BS 1 from the BS 1 according to the synchronization indication message. Besides, when the first time synchronization error is larger than the second time synchronization error, the synchronization indication message indicates the satellite ECS to make the UE to receive the external reference time information from the satellite ECS according to the synchronization indication message.

In one embodiment, the first time synchronization error includes at least one of a detection synchronization signal time error caused by the UE and a propagation delay time estimation error. The propagation delay time estimation error includes at least one of a preamble sequence transmission time error caused by the UE, a preamble sequence detection time error caused by the BS, and a timing advance granularity time error.

Besides, in one embodiment, the processor 15 further receives a piece of processing time error information from the UE via the transceiver 11, and the processor 15 obtains the detection synchronization signal time error and the preamble sequence transmission time error according to the processing time error information.

Corresponding to the seventh embodiment, the BS 1 provides a NUL frequency band and a SUL frequency band. A center frequency of the NUL frequency band is larger than a center frequency of the SUL frequency band, and a normal signal coverage of the NUL frequency band is smaller than a supplementary signal coverage of the SUL frequency band. In addition, a SCS of the NUL frequency band is larger than a SCS of the SUL frequency band. In this case, the processor 15 further determines whether a current location of the UE 2 is within both the normal signal coverage and the supplementary signal coverage, and calculates the first time synchronization error between the UE 2 and the BS 1 based on the SCS of the NUL frequency band when the current location is within both the normal signal coverage and the supplementary signal coverage.

According to the above descriptions, the BS of the present invention determines from which the UE has to receive a piece of reference time information for synchronizing its time by calculating time synchronization errors associated with subcarrier spacings (SCSs). Accordingly, the time synchronization mechanism of the present invention satisfies the requirement of the time synchronization between UEs and further integrates the TSN system into the 5G mobile communication system. In addition, the time synchronization mechanism of the present invention also improves the time synchronization between the UEs of the URLLC service type and the eMBB service type.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station (BS) for a mobile communication system, the BS being a primary BS for a user equipment (UE), the BS comprising:
    a transceiver;
    a network interface, being configured to connect to a secondary BS; and
    a processor, being electrically connected to the transceiver and the network interface, and being configured to execute the following operations:
        calculating a first time synchronization error between the BS and the UE, the first time synchronization error being associated with a first subcarrier spacing (SCS) of the BS and comprising at least one of a first detection synchronization signal time error caused by the UE and a first propagation delay time estimation error, the first detection synchronization signal time error and the first propagation delay time estimation error being associated with the first SCS;
        calculating a second time synchronization error between the secondary BS and the UE, the second time synchronization error being associated with a second SCS of the secondary BS and comprising at least one of a second detection synchronization signal time error caused by the UE and a second propagation delay time estimation error, the second detection synchronization signal time error and the second propagation delay time estimation error being associated with the second SCS;
        determining a smaller time synchronization error between the first time synchronization error and the second time synchronization error, the smaller time synchronization error corresponding to a target BS, the target BS being one of the BS and the secondary BS;

generating a synchronization indication message, the synchronization indication message indicating one of the BS and the secondary BS; and transmitting the synchronization indication message to the UE via the transceiver to make the UE to receive a piece of reference time information of the target BS from one of the BS and the secondary BS.

2. The base station of claim 1, wherein the first propagation delay time estimation error comprises at least one of a first preamble sequence transmission time error caused by the UE, a first preamble sequence detection time error caused by the BS, and a first timing advance granularity time error, and the second propagation delay time estimation error comprises at least one of a second preamble sequence transmission time error caused by the UE, a second preamble sequence detection time error caused by the BS, and a second timing advance granularity time error.

3. The base station of claim 2, wherein the processor further receives a piece of processing time error information from the UE via the transceiver, and the processor obtains the first detection synchronization signal time error, the first preamble sequence transmission time error, the second detection synchronization signal time error, and the second preamble sequence transmission time error according to the processing time error information.

4. The base station of claim 1, wherein the processor further executes the following operations:
determining whether the first SCS is larger than the second SCS;
determining that the first time synchronization error is smaller than the second time synchronization error and the target BS is the BS when the first SCS is larger than the second SCS; and
determining that the first time synchronization error is larger than the second time synchronization error and the target BS is the secondary BS when the first SCS is smaller than the second SCS.

5. The base station of claim 1, wherein the first time synchronization error further comprises a first reference time information granularity error, and the second time synchronization error further comprises a second reference time information granularity error.

6. The base station of claim 5, wherein the processor further determines whether the first SCS is larger than the second SCS, and determines whether a first reference time information granularity of the BS is larger than a second reference time information granularity of the secondary BS;
wherein when the first SCS is equal to the second SCS and the first reference time information granularity of the BS is smaller than the second reference time information granularity of the secondary BS, the processor determines that the target BS is the BS;
wherein when the first SCS is equal to the second SCS and the first reference time information granularity of the BS is larger than the second reference time information granularity of the secondary BS, the processor determines that the target BS is the secondary BS.

7. The base station of claim 1, wherein the processor further receives a piece of external reference time information to generate a piece of internal reference time information and transmit the internal reference time information to the secondary BS via the network interface, and the second time synchronization error comprises a transmission hop time error due to a transmission hop from the BS to the secondary BS.

8. The base station of claim 7, wherein the transmission hop time error is a time synchronization error based on a precision time protocol (PTP).

9. The base station of claim 7, wherein the network interface further connects to a core network, and the processor further receives the external reference time information from the core network via the network interface;
wherein the external reference time information is generated based on one of a grand master (GM) clock of the core network and a GM clock of a time-sensitive networking (TSN).

10. The base station of claim 7, further comprising a global navigation satellite system (GNSS) receiver, wherein the processor further receives the external reference time information from a satellite via the GNSS receiver.

11. The base station of claim 7, wherein the processor further executes the following operations:
determining whether the second SCS is larger than the first SCS;
when the second SCS is larger than the first SCS, determining whether the second time synchronization error including the transmission hop time error is smaller than the first time synchronization error;
when the second time synchronization error including the transmission hop time error is smaller than the first time synchronization error, determining that the target BS is the secondary BS and the synchronization indication message indicates the secondary BS;
when the second time synchronization error including the transmission hop time error is larger than the first time synchronization error, determining that the target BS is the BS, and the synchronization indication message indicates the BS; and
when the second SCS is equal to or smaller than the first SCS, determining that the first time synchronization error is smaller than the second time synchronization error, the target BS is the BS, and the synchronization indication message indicates the BS.

12. The base station of claim 7, wherein the first time synchronization error further comprises a first reference time information granularity error, and the second time synchronization error further comprises a second reference time information granularity error, the processor further determines whether the second SCS is larger than the first SCS, and determines whether a first reference time information granularity of the BS is larger than a second reference time information granularity of the secondary BS;
wherein when the second SCS is equal to the first SCS and the first reference time information granularity of the BS is larger than the second reference time information granularity of the secondary BS, the processor further executes the following operations:
calculating a time error difference between the first reference time information granularity of the BS and the second reference time information granularity of the secondary BS;
determining whether the time error difference is smaller than the transmission hop time error; and
determining that the target BS is the BS when the time error difference is smaller than the transmission hop time error.

13. The base station of claim 12, wherein when the second SCS is equal to the first SCS, and the first reference time information granularity of the BS is larger than the second reference time information granularity of the secondary BS, the synchronization indication message indicates the secondary BS, and the processor further transmits the reference time information of the BS to the secondary BS to make the secondary BS transmit the reference time information of the BS to the UE.

14. The base station of claim 1, wherein the BS provides a normal uplink (NUL) frequency band and a supplementary uplink (SUL) frequency band, a center frequency of the NUL frequency band is larger than a center frequency of the SUL frequency band, a normal signal coverage of the NUL frequency band is smaller than a supplementary signal coverage of the SUL frequency band, a SCS of the NUL frequency band is larger than a SCS of the SUL frequency band, and the processor further executes the following operations:
  determining whether a current location of the UE is within the normal signal coverage and the supplementary signal coverage; and
  calculating the first time synchronization error between the UE and the BS based on the SCS of the NUL frequency band when the current location is within the normal signal coverage and the supplementary signal coverage.

15. The base station of claim 1, wherein the BS, in cooperation with the secondary BS, performs one of a carrier aggregation (CA) transmission and a dual connectivity (DC) transmission with the UE;
  wherein when the BS performs the CA transmission, the BS uses a first component carrier (CC), and the secondary BS uses a second CC.

16. The base station of claim 1, wherein one of the BS and the secondary BS is located on a satellite.

17. A base station (BS) for a mobile communication system, comprising:
  a transceiver;
  a global navigation satellite system (GNSS) receiver; and
  a processor, being electrically connected to the transceiver and the GNSS receiver, and being configured to execute the following operations:
    receiving a piece of external reference time information from a satellite via the GNSS receiver;
    calculating a first time synchronization error between a user equipment (UE) and the BS, the first time synchronization error comprising at least one of a detection synchronization signal time error caused by the UE and a propagation delay time estimation error;
    calculating a second time synchronization error between the UE and the satellite;
    determining whether the first time synchronization error is smaller than the second time synchronization error to generate a synchronization indication message; and
    transmitting the synchronization indication message to the UE via the transceiver;
    wherein when the first time synchronization error is smaller than the second time synchronization error, the synchronization indication message indicates the BS to make the UE to receive a piece of reference time information of the BS from the BS according to the synchronization indication message, and when the first time synchronization error is larger than the second time synchronization error, the synchronization indication message indicates the satellite to make the UE to receive the external reference time information from the satellite according to the synchronization indication message.

18. The base station of claim 17, wherein the propagation delay time estimation error comprises at least one of a preamble sequence transmission time error caused by the UE, a preamble sequence detection time error caused by the BS, and a timing advance granularity time error.

19. The base station of claim 18, wherein the processor further receives a piece of processing time error information from the UE via the transceiver, and the processor obtains the detection synchronization signal time error and the preamble sequence transmission time error according to the processing time error information.

* * * * *